June 1, 1965 J. E. SMITH, JR 3,187,317

DISC FILE

Filed Dec. 7, 1961 16 Sheets-Sheet 1

INVENTOR.

JOSEPH E. SMITH JR.

BY

Bower & Patalidis

ATTORNEYS

June 1, 1965 J. E. SMITH, JR 3,187,317

DISC FILE

Filed Dec. 7, 1961 16 Sheets-Sheet 2

INVENTOR.
JOSEPH E. SMITH JR.
BY
Bower & Patalidis
ATTORNEYS

June 1, 1965 J. E. SMITH, JR 3,187,317

DISC FILE

Filed Dec. 7, 1961 16 Sheets-Sheet 3

INVENTOR.
JOSEPH E. SMITH JR.
BY
Bower & Patalidis
ATTORNEYS

June 1, 1965 | J. E. SMITH, JR | 3,187,317

DISC FILE

Filed Dec. 7, 1961 | 16 Sheets-Sheet 4

INVENTOR.
JOSEPH E. SMITH JR.
BY
Bower & Patalidis
ATTORNEYS

June 1, 1965 J. E. SMITH, JR 3,187,317

DISC FILE

Filed Dec. 7, 1961 16 Sheets-Sheet 5

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

June 1, 1965 J. E. SMITH, JR 3,187,317

DISC FILE

Filed Dec. 7, 1961 16 Sheets-Sheet 8

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

June 1, 1965 J. E. SMITH, JR 3,187,317

DISC FILE

Filed Dec. 7, 1961 16 Sheets-Sheet 10

INVENTOR.
JOSEPH E. SMITH JR.
BY
Bower & Patalidis
ATTORNEYS

June 1, 1965 | J. E. SMITH, JR | 3,187,317

DISC FILE

Filed Dec. 7, 1961 | 16 Sheets-Sheet 11

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

INVENTOR.
JOSEPH E. SMITH JR.
BY
Bower & Patalidis
ATTORNEYS

United States Patent Office 3,187,317
Patented June 1, 1965

3,187,317

DISC FILE

Joseph E. Smith, Jr., Birmingham, Mich., assignor to Ex-Cell-O Corporation, Detroit, Mich., a corporation of Michigan Filed Dec. 7, 1961, Ser. No. 157,667
12 Claims. (Cl. 340—174.1)

This invention relates generally to magnetic data storage devices. More particularly, the invention relates to new and useful improvements in apparatus capable of storing or filing vast quantities of data or information and enabling rapid retrieval of any specific part of the stored information.

It is well known that any data or information can be coded, generally in the form of binary representation of the letters and numbers used in ordinary language. The coded information, representing "words" consisting of a certain number of "bits," can be stored, temporarily or permanently, in many ways and for many purposes whatsoever. The coded information may be stored, for example, in the form of perforations, according to a predetermined scheme, on cards, paper tape, metallic tape, or in the form of electrostatic or magnetic impulses impressed upon an appropriate support medium.

The store of coded information is then available for input into a computer, for reference purpose, for control of a machine, to cite only a few examples.

The invention relates principally to apparatus providing ways and means of storing coded data or information in the form of magnetic impulses recorded on a magnetizable medium. The invention contemplates accomplishing this purpose by recording the magnetic impulses upon rotating magnetic surfaced discs so arranged that a plurality of such discs carry information recorded on a plurality of concentric tracks for almost immediate playback of any appropriate information out of a multitude. Any such information can be selected at random, once properly indexed, played back for whatever purpose, erased at will and replaced by new information. It can thus be seen that the invention has many applications such as, to name only a few, filing business records, recording reservations for public carriers, storing statistical data, library indexes, abstracts of scientific knowledge, information as to insurance records, inventories, etc. A complete list of all the useful purposes of the invention would include almost every facet of human endeavor, where numbers and letters need be stored away, transferred, transposed, operated upon by addition, subtraction, multiplication, division and the like. It is evident that the invention has many advantageous applications in connection with the "memory" portion of modern electronic computers, either as the main high capacity memory, or as a buffer memory for the storage of transient data, or as both. Moreover, because of its inherent extreme flexibility, the invention is easily adaptable to fulfill some of the functions normally typical of elements that are customarily included in the circuits of the computing machine itself, such as delay circuits, shift registers, recirculation loops, etc.

Dynamic magnetic recording and playback of data, as opposed to static recording as effected for example in magnetic core matrices, has been well known in the art up to the present. The prior art dynamic recording systems contemplate generally the use of magnetic tapes, drums and discs. Magnetic tapes enable the user to store a considerable amount of data under a relatively small volume, but have the inconvenience of not allowing fast access to a given information, as sometimes a considerable length of tape must be searched before the required data can be brought under the read transducer head.

Magnetic data storage systems using a magnetic surfaced drum have the advantage of fast access to the recorded information but present the serious drawback of occupying a large volume of space for a relatively small store of information. The fast access is due to the fact that a magnetic drum has normally as many read-write transducer heads as there are tracks on the drum, and the maximum time for selecting a given track is almost instantaneous, as the heads can be electronically switched on and off, while the waiting time required before beginning to read the data is at most the time that it takes the drum to revolve one revolution.

Fast access, however, is costly in drum systems, because the amount of recorded data is limited, the volume occupied by the apparatus is important when compared to the amount of information that can be recorded on parallel tracks on the peripheral surface of the drum, and as many read-write heads must be provided as there are tracks, all of which results in an expensive and delicate apparatus, difficult to manufacture, troublesome to maintain.

Magnetic data storage systems of the disc type, on the other hand, make better use of the space available by being able to store a vast amount of information under a relatively small volume by recording on a magnetizable surface on both faces of a somewhat thin disc wafer. The prior art has contemplated use of two general dispositions of apparatus.

In one type of apparatus, the magnetic discs are filed away in a cabinet where they are normally at rest. They must be brought to a playing position and mechanically spun; the information is thus recorded or read, the disc rotation is stopped and the disc is filed away. This type of apparatus is complicated and of slow access to the recorded information because of all the operations and motions involved in the preparation of any disc for recording or playback. An improvement upon the above described system consists in spinning the discs in the cabinet where they are filed, doing away with the requirement of transporting them to a playing position; however, this improvement increases the complication and cost of the apparatus, as it requires that disc spinning means be provided at each disc location and write-read transducers either be provided at each such location or be movable to each such location.

In the other type of apparatus, the discs are all supported by a common shaft or spindle and are spinning constantly. The transducer heads must be brought to a predetermined position in order to record or read the appropriate information, recorded generally on concentric tracks on each face of every disc. The only other alternate arrangement is to provide one read-write head for each track, leading to a prohibitive number of magnetic transducers resulting in a prohibitive complication and cost of the apparatus.

The present invention utilizes a plurality of magnetic surfaced discs spinning at all times. Each face of every disc has a plurality of concentric tracks upon which information can be recorded or from which information can be read by means of at least one magnetic transducer head per face. Means are provided for indexing the transducer head with the appropriate track, and the apparatus is endowed with a capacity, a flexibility, a ruggedness, a simplicity and a dependability which are a great improvement upon methods and apparatus available prior to the present invention. The present invention is an improvement upon the magnetic data storage devices described in the copending applications Serial Nos. 773,585 and 773,586, both filed November 13, 1958, by Forrest A. Johnson and Herbert E. Miller, which have now matured as Patent No. 3,009,-759, issued November 21, 1961, and as Patent No. 3,056,-

962, issued October 2, 1962, respectively, and in their copending patent application Serial No. 128,190, filed July 31, 1961, which is a continuation of said Patent No. 3,056,962, all of which are assigned to the same assignee as the present invention.

The principal object of the present invention, therefore, is to condense a vast store of information into a relatively small volume.

An added object of the invention is to accomplish its principal object by providing a magnetic data storage device having the said information recorded in the form of magnetized pulse spots, or "bits," on a plurality of concentric tracks on the magnetizable surfaces on both sides of a rotating disc.

Another object of the invention is to provide an apparatus having a plurality of such discs being driven by a common shaft, with the possibility of varying the total capacity of the store or file according to the number of such discs utilized in the final assembly of the apparatus.

Still another object of the invention is to provide a file of stored information which is of a permanent nature for as long as the information is pertinent, but which is replaceable at any time in total or in part as to the contents of the data therein, and which may be searched and read at will without loss of or injury to the recorded information.

A further object of the present invention is to provide means affording a rapid access to any portion of the stored information.

One more object of the invention is to provide the necessary "clock" tracks supplying timing or "sprocket" signals to insure that the recording and playback of the stored information is always in phase with the base time of any other apparatus to which the invention may be connected.

Another object of the invention is to provide special purpose tracks on any of such discs, as required, for operations normally of the resort of typical computing machines, such as delays, recirculation, shifts of data, etc.

A further object of the invention is to provide at least one read-erase-write magnetic transducer for each face of the discs, the said transducer being mounted on a rocker arm assembly that enables it to be indexed at will with the appropriate track on the disc surface, doing away with the requirement that there be one transducer for each track on the disc surface.

Still a further object of the invention is to provide means to rotate the said rocker arm assembly to a plurality of discrete positions, in response to a command input signal to a positioning mechanism, and to provide diverse independent rocker arm assemblies each with its own positioning mechanism, where so required.

One more object of the invention is to provide frictionless pivot means for the transducer head rocker arm assembly, and positioning means for the same having practically no back lash, in order to insure infinitely repeatable indexing of the transducer heads over a plurality of precisely determined tracks on the surface of the discs.

A further object of the invention is to provide a sturdy and rigid support for the interrelated components in order to insure constancy of operation in spite of vibrations, distortion of the base, changes in temperatures, etc.

Still another object of the invention is to provide a constant linear relation between the read-erase-write transducer heads and the clock heads, in order to perfectly match the information pulses with the timing pulses during writing as well as during reading of the data.

Still a further object of the invention is to provide a magnetic data storage device that permits parallel storing of information as well as series and series-parallel storing.

Another object of the invention is to provide a magnetic data storage apparatus which is strong, sturdy, easy and relatively inexpensive to manufacture, almost foolproof to operate and having components easily accessible for inspection and maintainance.

Other objects and advantages of the invention will be pointed out in the following description and claims and illustrated in the accompanying drawings which disclose, by way of example, the principles of the invention and the best modes which have been contemplated of applying those principles.

Figures 18, 22:
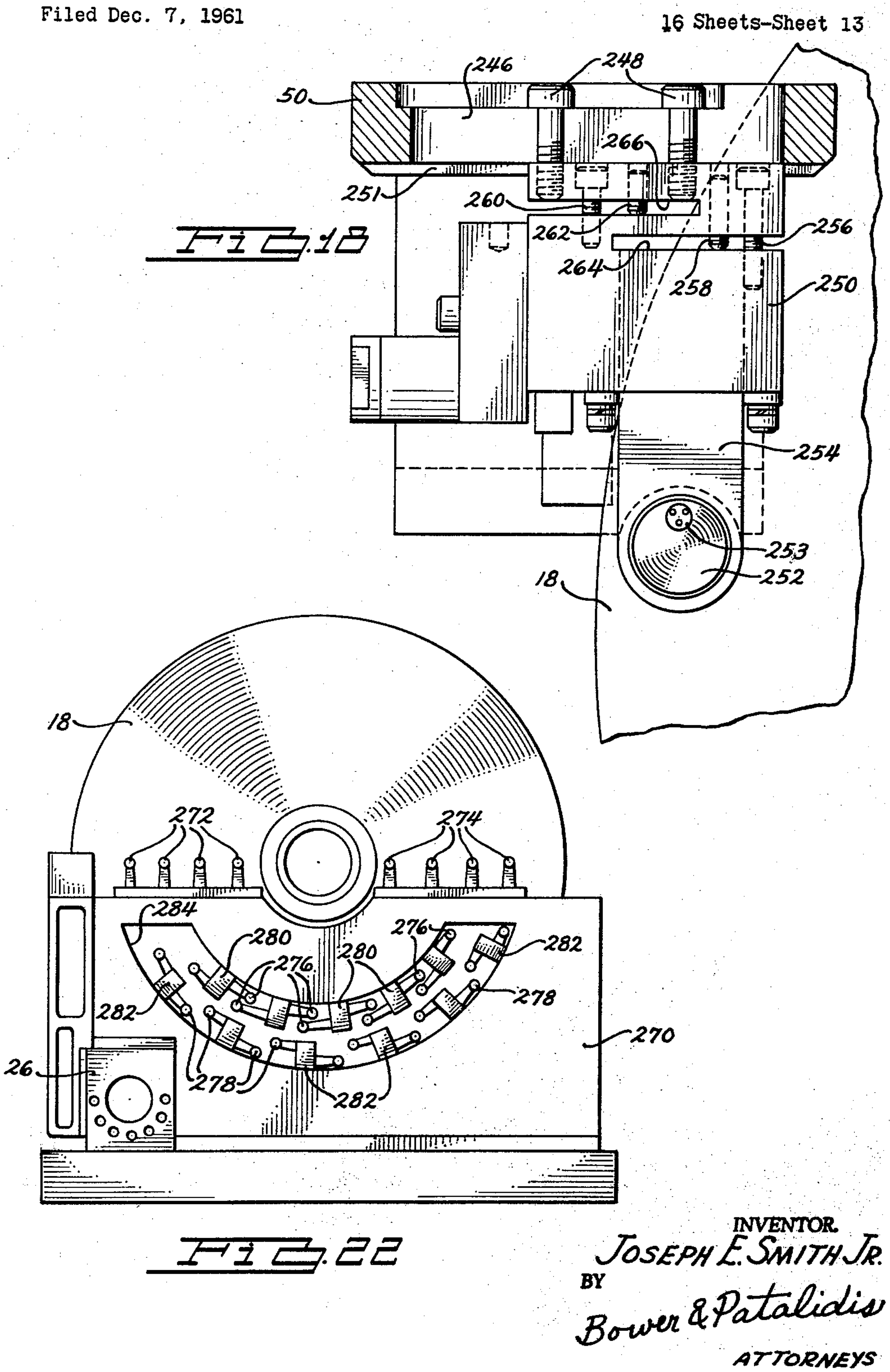
FIGURE 18 is a transverse sectional view of the component of FIGURE 17 as seen from line 18—18 of FIGURE 17.
Figures 19, 20, 21:
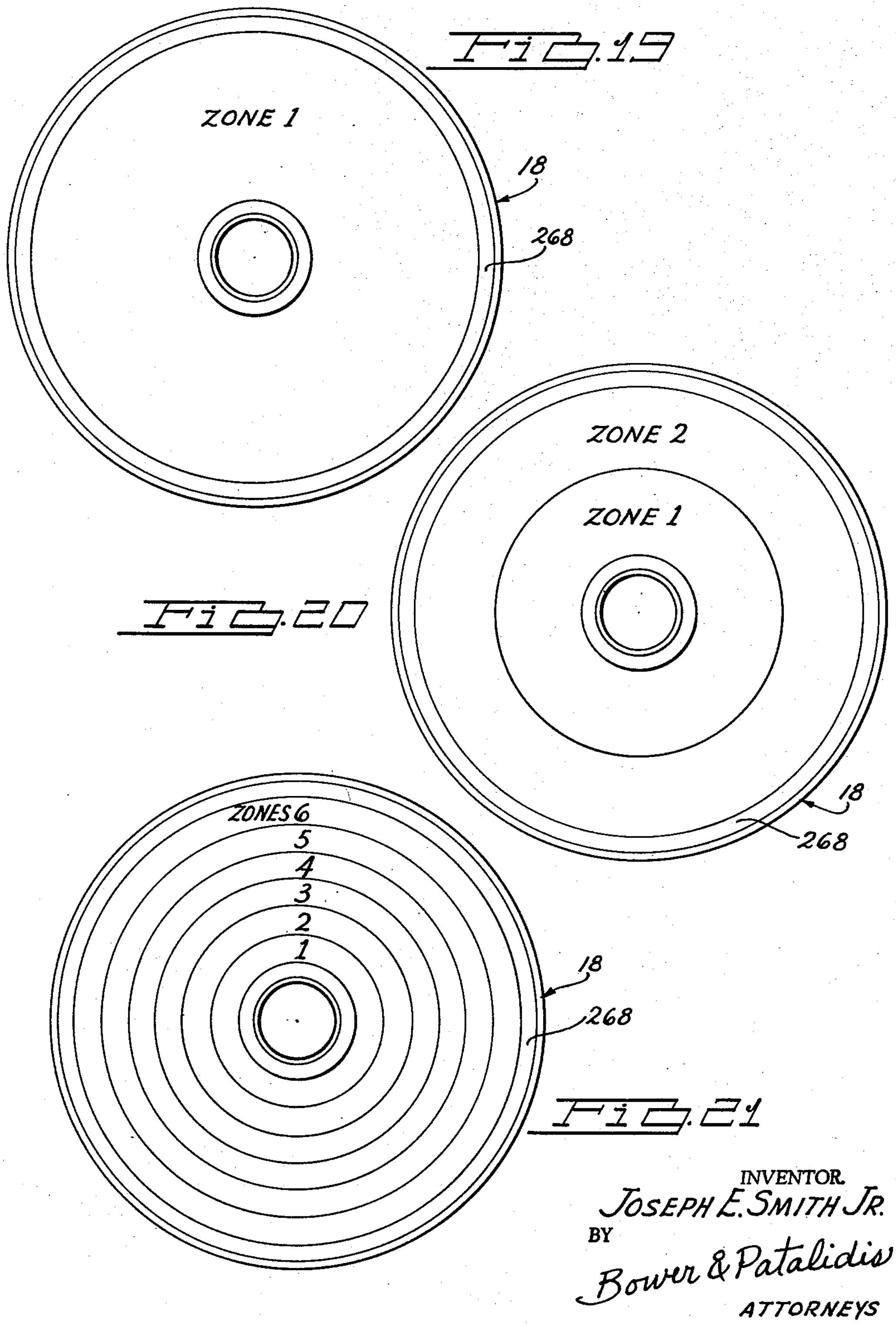
Figure 23:
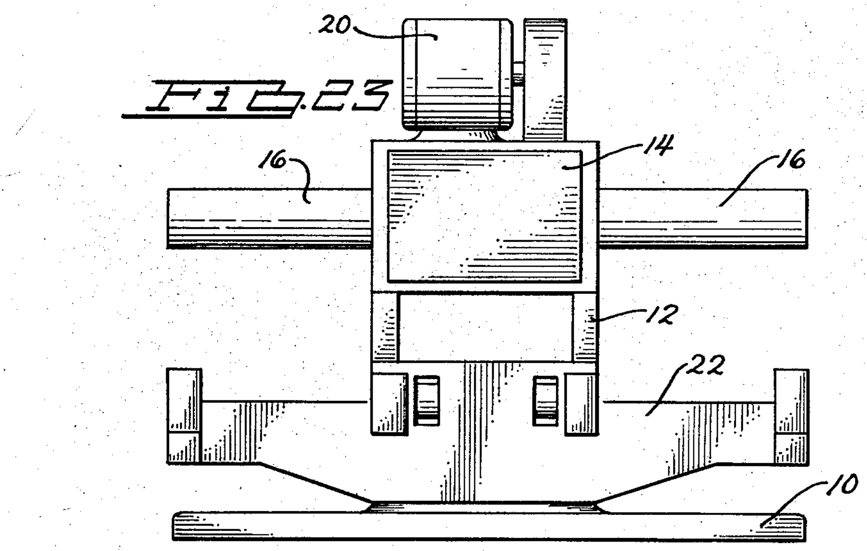
Figure 24:
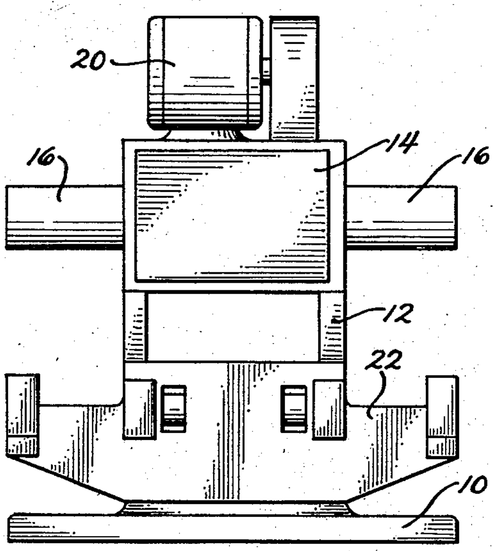
Figure 25:
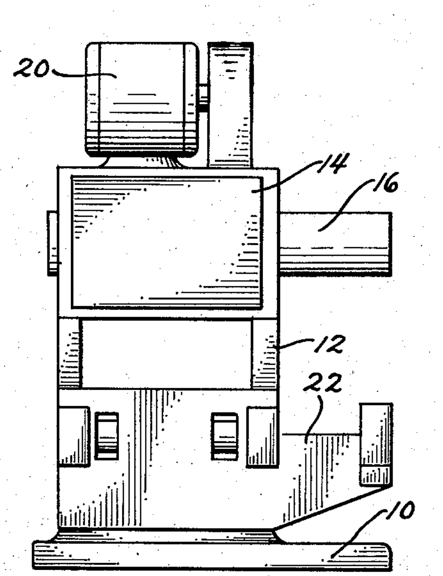
Figure 26:
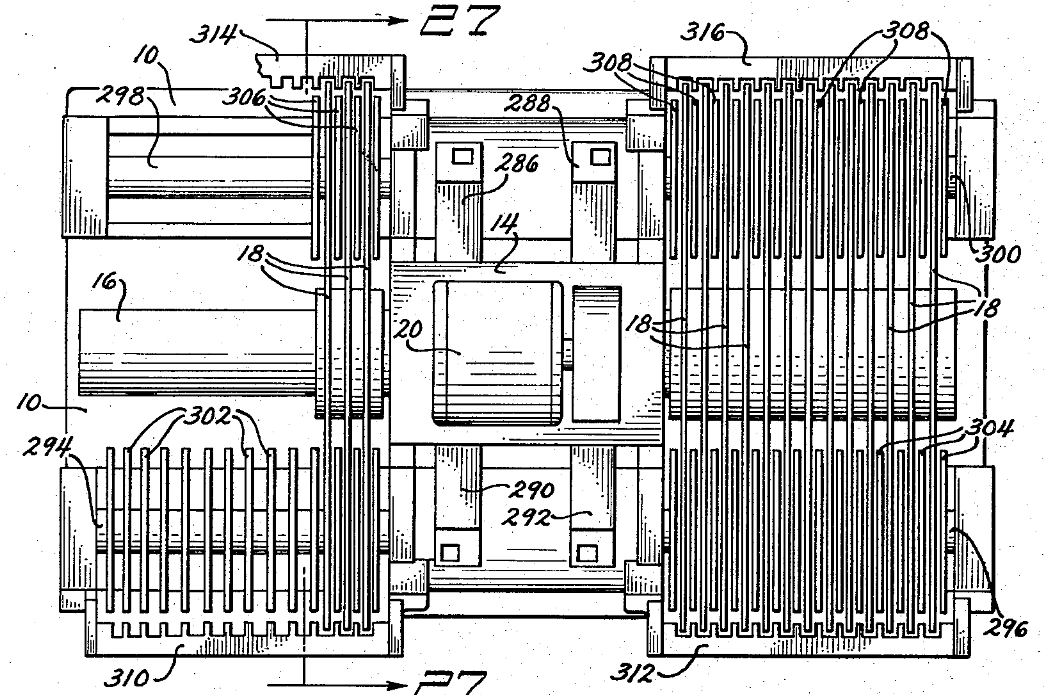
Figure 27:
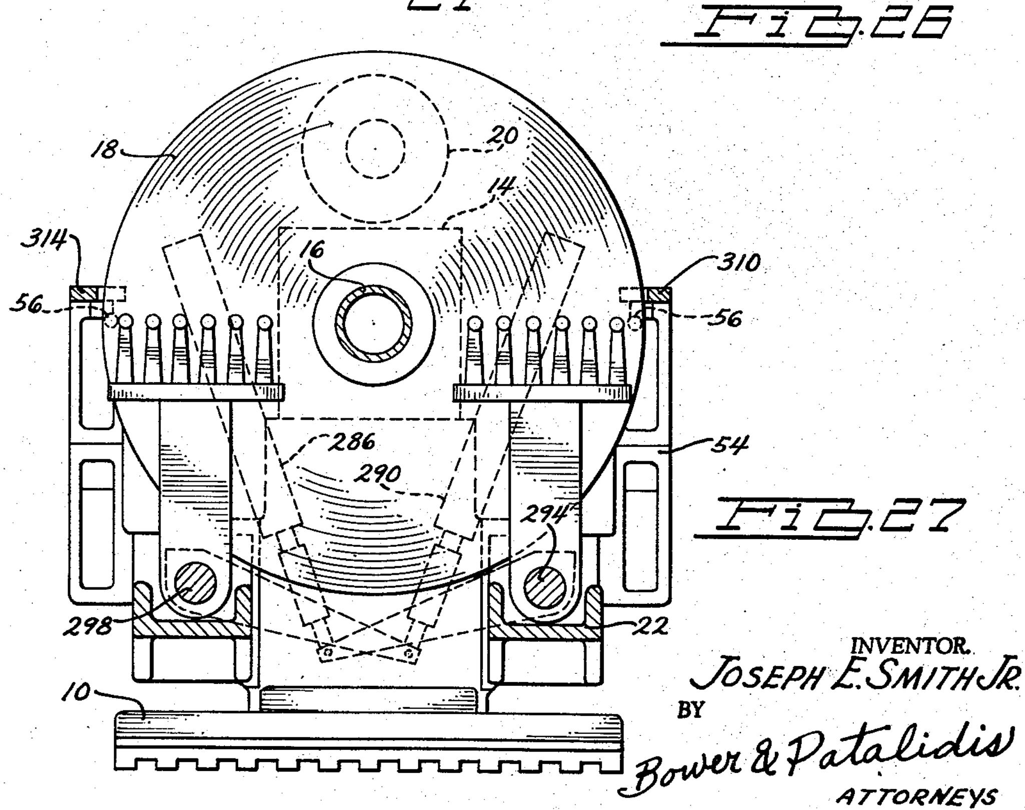

FIGURES 19, 20 and 21 diagrammatically represent examples of track zones arrangements on the surface of the discs of the apparatus of the invention;

FIGURE 22 shows an example of the outer face of an outermost disc of the apparatus of the invention being used for special purposes;

FIGURE 23 is a view in elevation illustrating a portion of the apparatus shown in FIGURES 1–6;

FIGURE 24 is a view in elevation showing a modification of the portion of the apparatus shown in FIGURE 23;

FIGURE 25 is a view in elevation illustrating another modification of the apparatus shown in FIGURE 23;

FIGURE 26 is a top plan view of a modification of the apparatus of FIGURES 1–6; and FIGURE 27 is a cross sectional view along line 27—27 of FIGURE 26.

GENERAL DESCRIPTION

With reference to FIGURES 1–6, the disc file of the invention is shown as consisting of a base 10 upon which is mounted a pedestal 12, which in turn supports all the components of the device.

On top of the pedestal is mounted a spindle bearing housing 14 in which is journaled a spindle 16 extending outwardly on two sides thereof and which, in turn, supports a plurality of discs 18. An electric motor 20 mounted on top of the spindle bearing housing supplies the drive power for the spindle and discs.

The pedestal 12 also carries a box-like open top rocker arm shaft housing 22 having on both ends rocker arm shaft end bearings 24 and 26. The housing 22 partly encloses rocker arm shafts 28 and 30. A plurality of rocker arms 32 are clamped on each rocker arm shaft and they, in turn, support head bar assemblies 34, one such head bar assembly being provided for each rocker arm. Each head bar assembly 34 supports in turn a plurality of transducer head assemblies 36 (not shown in FIGURES 3, 4 and 5).

The rocker arms 32 can be rotated a few degrees from a neutral position by means of swing arm 38 and swing arm 40 acting respectively upon rocker arm shafts 28 and rocker arm shaft 30. The other ends of the swing arms, extending through apertures 39 and 41 in the pedestal are connected together by means of a yoke 42 acted upon by the output shaft 44 of a linear positioner 46 fastened to the pedestal by means of a bracket 47. The positioner 46 is provided with a plurality of solenoid actuated valves 48, seven valves being shown in the present example, which are capable of controlling the positioner in such a way as to index the transducer heads with the appropriate tracks, under the control of an address input electrical signal fed in parallel to the said valves.

Clock head bridges 50 are fastened on the top of supports 52 and 54 which in turn are fastened to the rocker arm shaft housing 22. Each clock head bridge 50 in turn supports a plurality of clock head assemblies 56 whose magnetic transducer heads register with the appropriate clock track or timing track close to the edge of the disc surface.

DETAILED DESCRIPTION

*Base-pedestal support assembly*

Referring again to FIGURES 1–6, a resilient pad 58 is affixed to the underneath of the base 10 to insulate the latter from the underlining ground.

Figure 2:
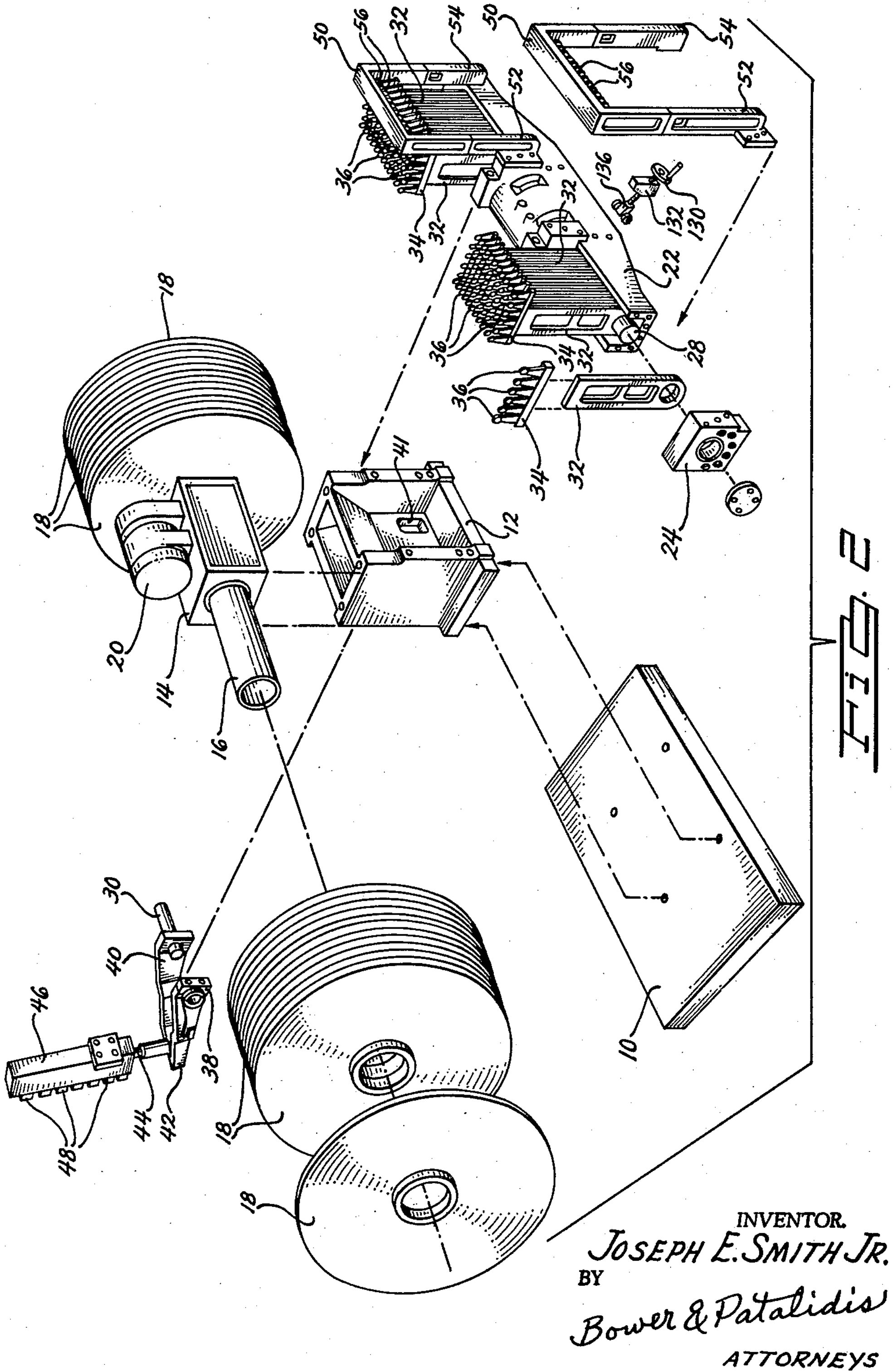
FIGURE 2 is a perspective exploded view of the apparatus of FIGURE 1.
Figure 3:
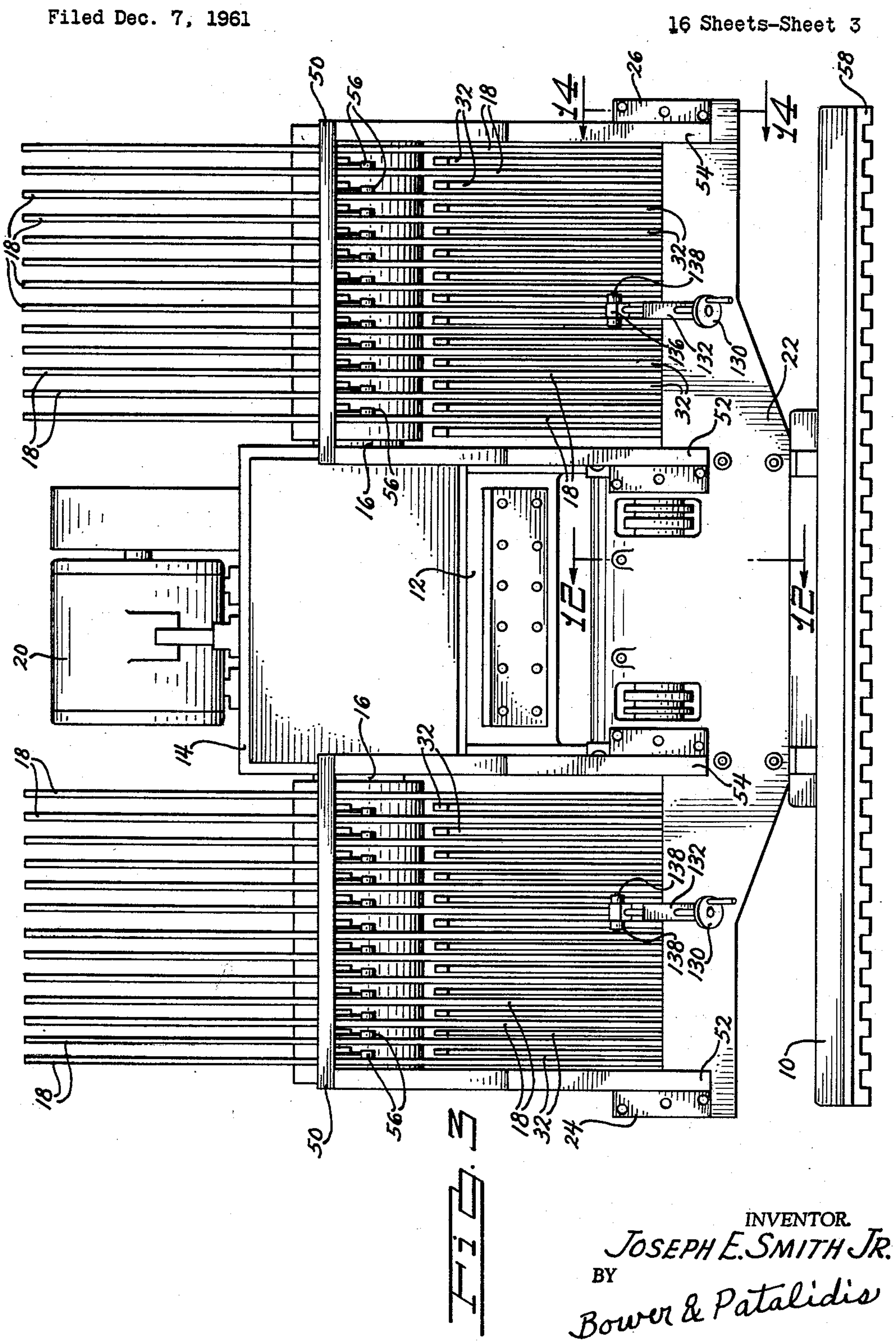
FIGURE 3 is a front elevation view of the same apparatus.
Figure 4:
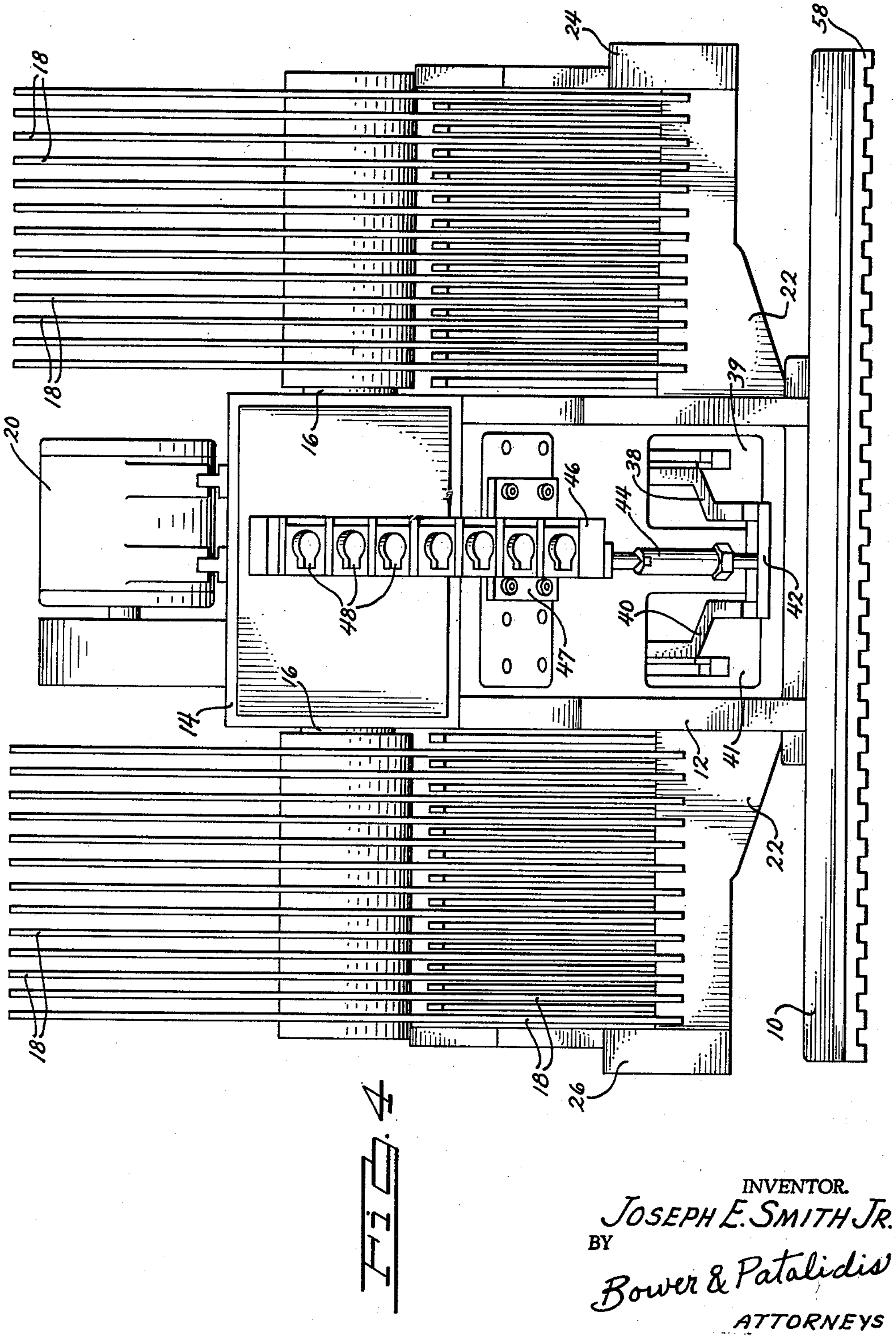
FIGURE 4 is a rear elevation view of the same apparatus.
Figure 5:
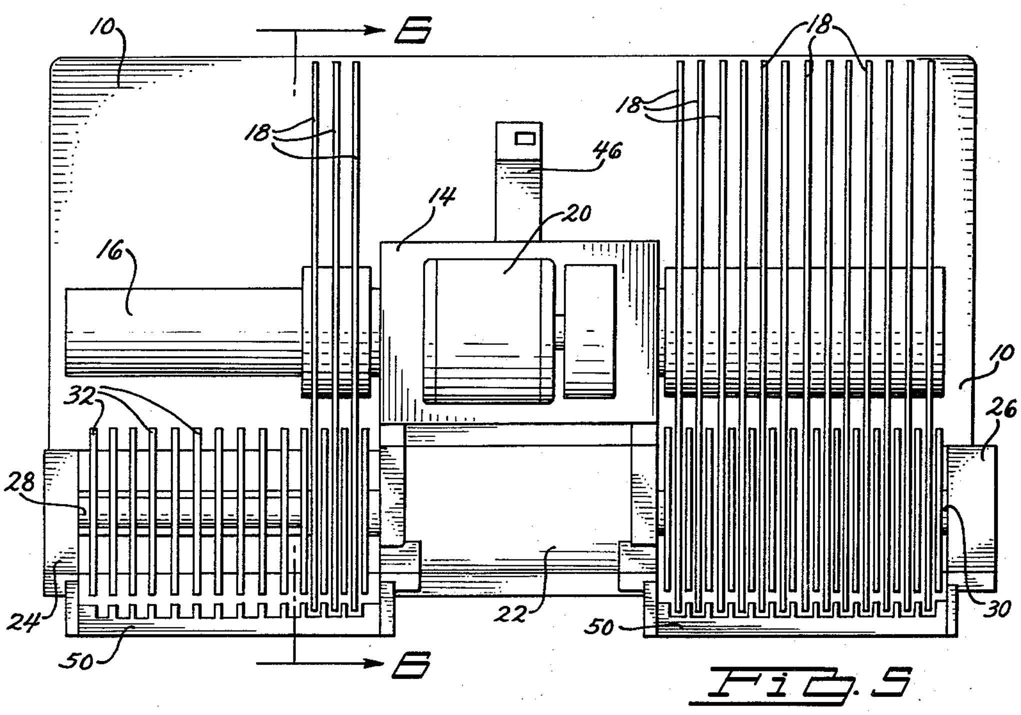
FIGURE 5 is a top plan view of the same apparatus.
Figure 6:
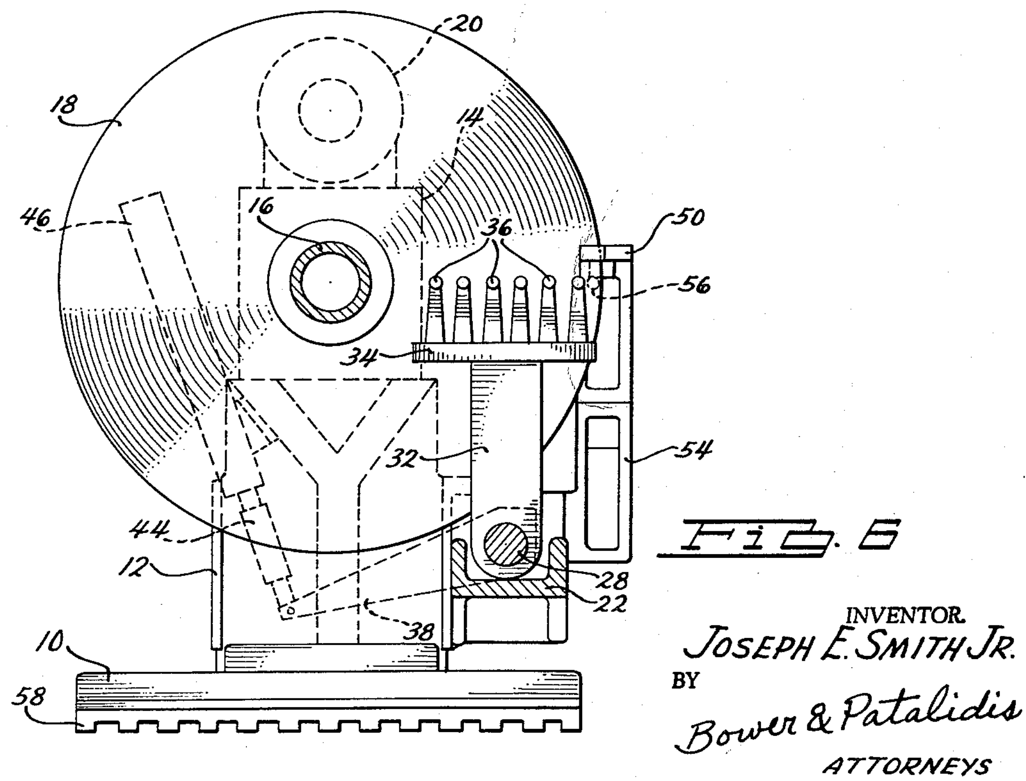
FIGURE 6 is a sectional view taken along line 6—6 of FIGURE 5, as viewed in the direction of the arrows.

The pedestal 12, mounted upon the base, is a substantially rigid element with a vertical Y-shaped rib along its center line as best seen in FIGURES 2 and 6.

The pedestal and not the base, supports all the elements constituting the disc file, as hereinbefore explained. The base can thus be subjected to vibrations, can be placed on a relatively uneven ground, without any adverse effect on the dimensional interrelation of the elements of the disc file. This would not be the case if the rocker arm assemblies, the clock head assemblies and the positioner assemblies, for example, were supported by the base itself.

In the latter event, any distortion of the base due to thermal changes, to uneven ground or to any reason whatsoever, would be transmitted to the components, bringing unpredictable variations in the built-in precision of the dimensional relationship between the components.

*Spindle-discs assemblies*

Figure 7:
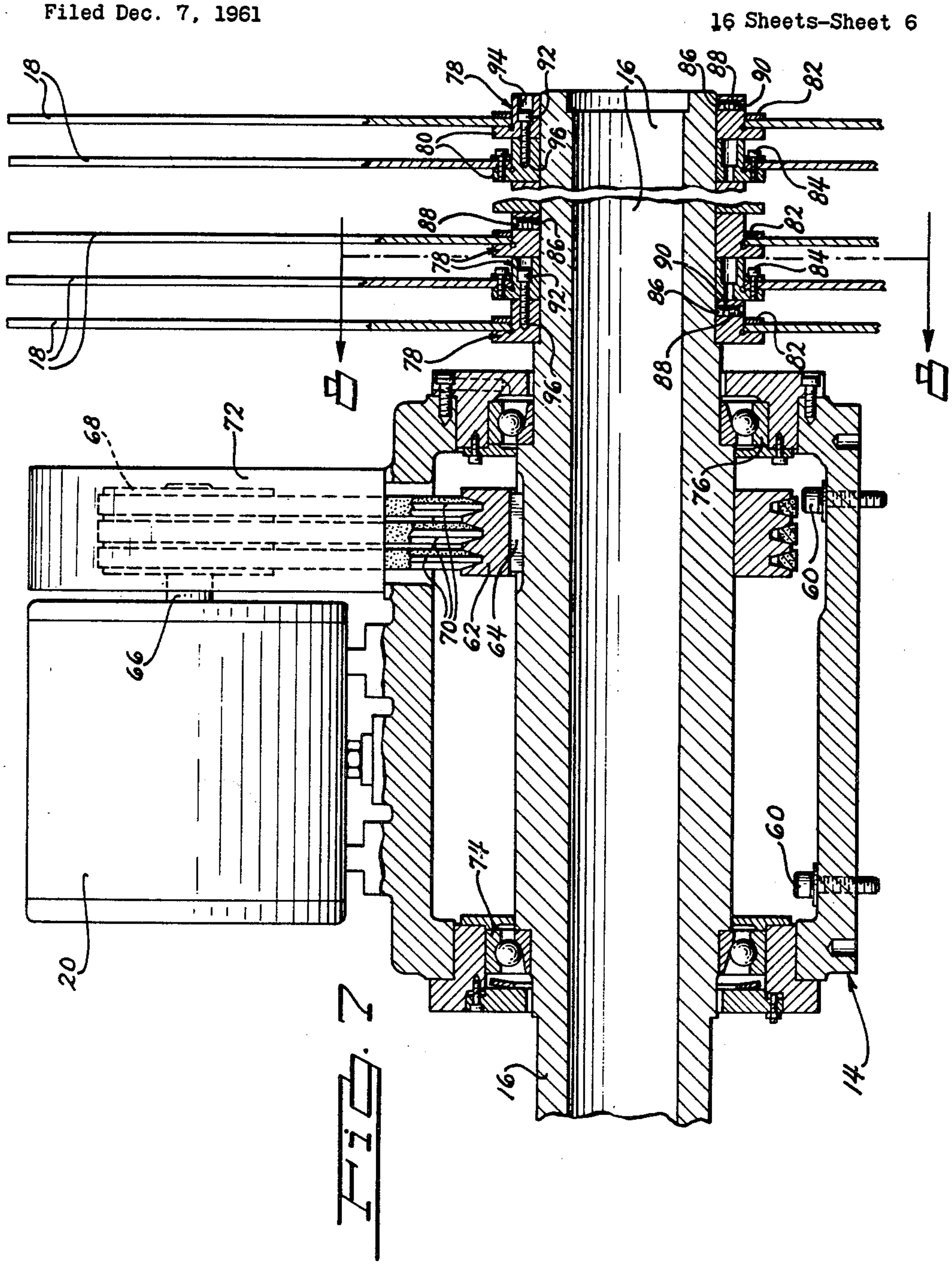
FIGURE 7 is a longitudinal sectional view of a portion of the apparatus shown in the preceding figures.
Figures 8, 9, 10:
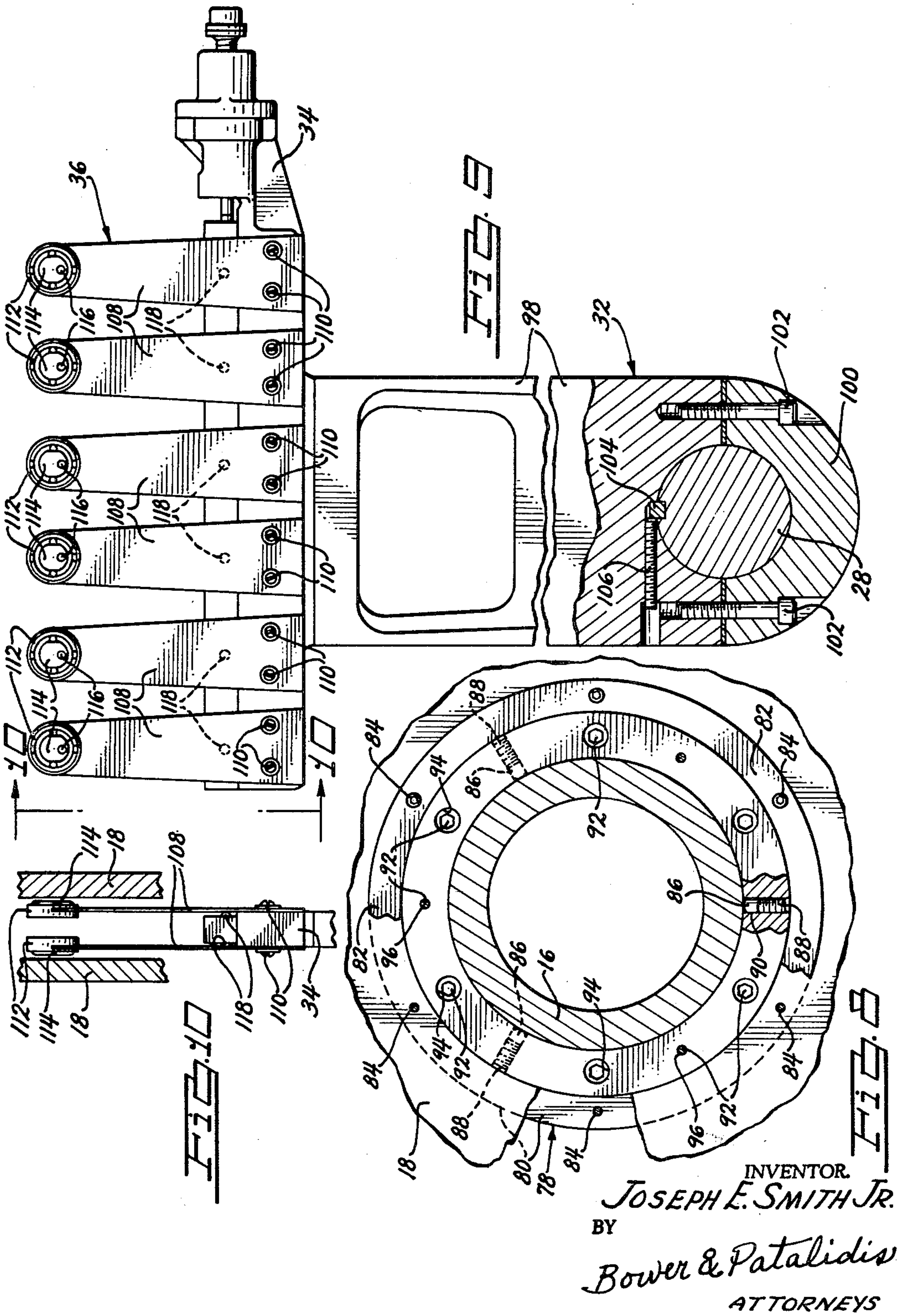
FIGURE 8 is a partial cross sectional view taken along line 8—8 of FIGURE 7, as viewed in the direction of the arrows.
FIGURE 9 is a view partly in elevation and partly in cross section of a portion of the apparatus.
FIGURE 10 is an end view of the component of FIGURE 9, as viewed from line 10—10 of FIGURE 9 in the direction of the arrows.

Referring again to FIGURE 1 and more particularly to FIGURES 7–8, the pedestal 12 supports the spindle bearing housing 14 by means of fastening screws such as 60. The hollow spindle 16 is journaled in the housing 14 by means of ball bearings 74 and 76. A pulley 62, fast to the spindle by means of a key 64, supplies rotary motion. The electric motor 20 has a motor shaft 66 with a driving pulley 68, and V-belts 70 are wound around the motor driving pulley and the spindle driven pulley 62. A cover or guard 72 protects the driving arrangement.

The discs 18, which are thin wafers of non-magnetic material such as aluminum, magnesium or aluminum alloy, and which support a magnetizable record surface on both faces, are mounted upon the spindle 16 by means of hubs 78. Each such hub has a flange 80 upon which the disc is fastened by means of a mounting ring 82 and mounting screws 84. The hub is locked on the spindle 16 by a plunger 86 acting radially and which is tightened by a set screw 88 disposed within a radial threaded bore 90. The several hubs are held together by means of hold bolts 92 disposed in longitudinal countersunk bores 94, and threading in threaded holes 96.

In that fashion, the discs rotate as a unit, and any displacement of one disc relatively to the other is prevented.

*Transducer heads—Rocker arm assembly*

Referring once again to FIGURES 1–6 and also more particularly to FIGURES 9–10, each rocker arm assembly, designated generally by numeral 32, comprises a rocker arm 98 provided with an end cap 100 for the purpose of clamping upon the rocker arm shaft, such as 28, by means of bolts 102. A key 104, immobilized by a set screw 106, prevents relative motion between the rocker arm shaft and the rocker arm assembly.

The transducer head bar assembly 34 mounted on the upper end of the rocker arm, carries in turn a plurality of transducer head assemblies 36 disposed in two parallel rows back to back in such a way as to record on and playback from two opposite sides of two consecutive discs 18. One row only of transducer heads is of course required for the outer faces of the end discs.

Each individual transducer head assembly comprises a resilient reed 108 having one end fastened to the head bar 34 by means of screws 110 and having its other end supporting, for example, a gimballed transducer head assembly 112. A bearing pad 114, pivotally supported within the inner ring of the gimbal carries a transducer head 116. The gimballed transducer head assembly is no part of the present invention and is described in detail in copending application Serial No. 132,160 now abandoned filed August 17, 1961 by Leonard S. Bleininger, and assigned to the same assignee as the present invention. The transducer head is also no part of the present invention and is the subject matter of copending application of Theodore C. Foster and Joseph E. Smith, Jr., Serial No. 142,419, filed October 2, 1961, and assigned to the same assignee as the present invention.

A plunger 118, when activated, bends reed 108 to bring the transducer head pad 114 in proximity to the magnetizable record surface on discs 18, until the pad is supported by the laminar film of air induced by the rotation of the disc.

Plunger 118 is actuated by a mechanism (not shown) which forms no part of the present invention and which is interlocked with a safety device, such as a tachometer for example, which prevents accidentally forcing the transducer heads to a "flying" position when the velocity of the discs is insufficient to develop a laminar film of air strong enough to bear the transducer head pads.

It is obvious that the transducer head assemblies herein described are for illustrative purpose only and that different assemblies could also be used in combination with the disc file of the invention. "Non-contact" transducer heads mounted in a pad floating on a film of fluid other than air, such as oil for example, could also be used as well as "contact" transducer heads touching the record surface at all times or only during starting and stopping of the apparatus and being fluid borne when the rotation velocity of the discs is sufficient to create a bearing film of fluid.

Figure 11:
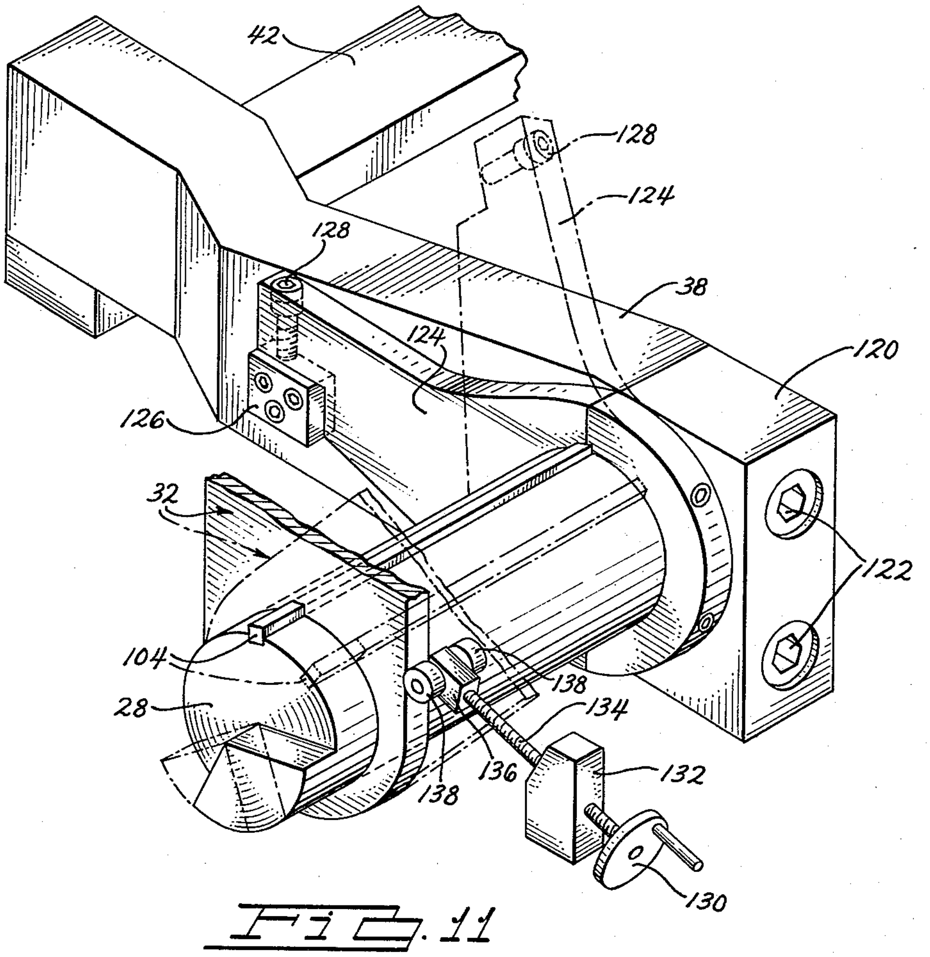
FIGURE 11 is a perspective view of another component of the apparatus.
Figure 12:
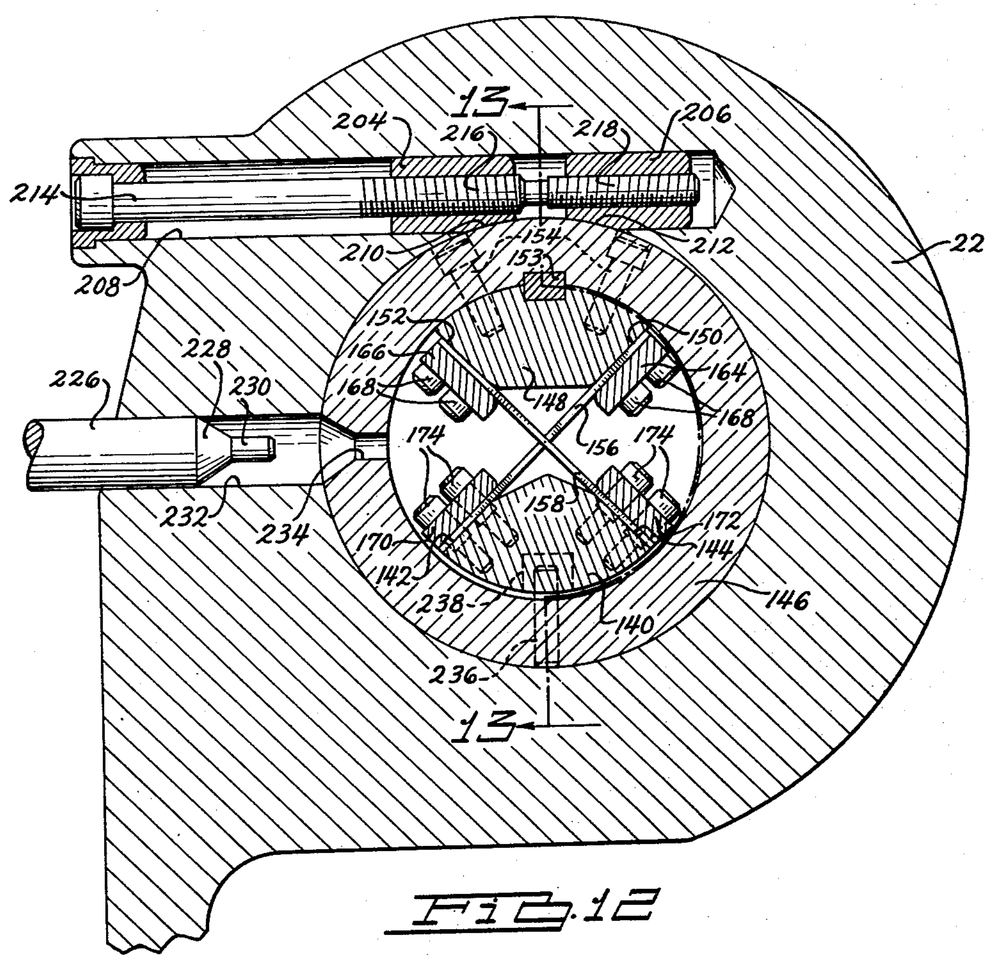
FIGURE 12 is a partial cross sectional view of a portion of the apparatus, as seen from line 12—12 of FIGURE 3.
Figure 13:
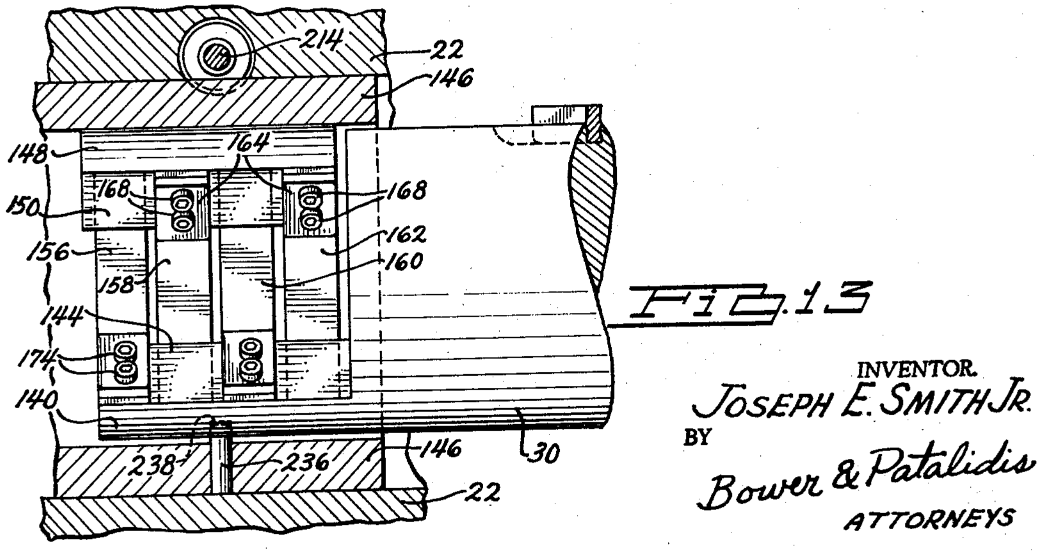
FIGURE 13 is a partial longitudinal view of the portion of the apparatus shown in FIGURE 12 as seen from line 13—13 of FIGURE 12.
Figure 14:
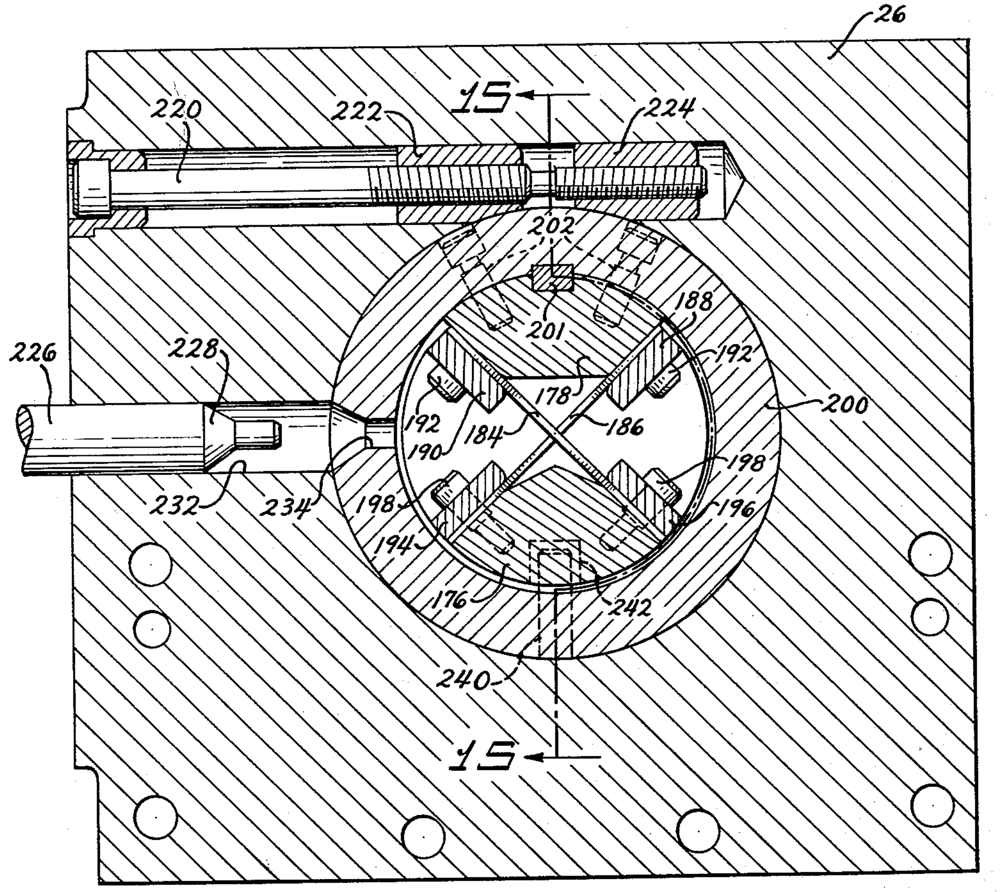
FIGURE 14 is a partial cross sectional view of a portion of the apparatus, as seen from line 14—14 of FIGURE 3.
Figure 15:
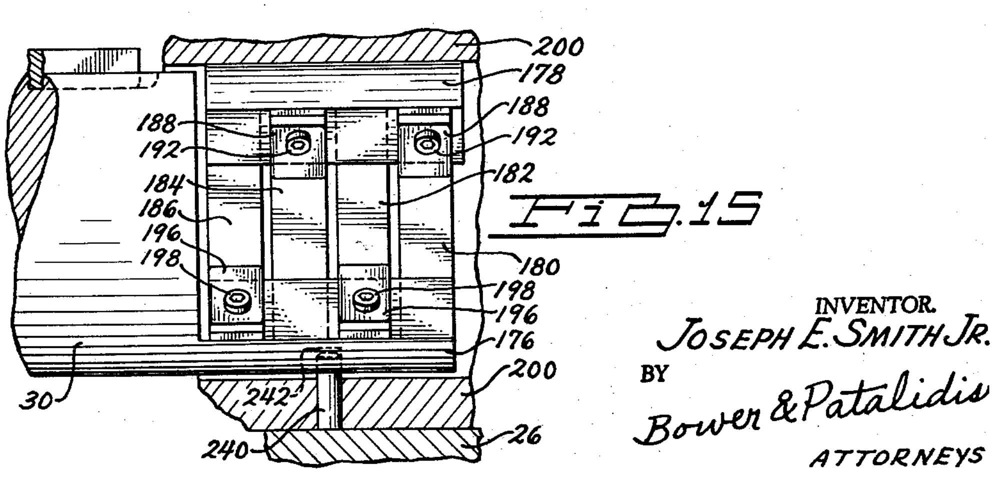
FIGURE 15 is a partial longitudinal view of the portion of the apparatus shown in FIGURE 14 as seen from line 15—15 of FIGURE 14.

As mentioned previously, the rocker arm shafts 28 and 30 are capable of being angularly positioned by the positioner 46, swinging the rocker arms 32 and causing the transducer heads to accurately scan the surfaces of the disc. To enable the rocker arms to be manually swung out of their operative position between consecutive discs, for purpose of inspection and maintenance when the apparatus is shut off, a disconnect device has been provided for the swing arms 38 and 40, together with a jackscrew system for manual swinging of the rocker arms. As shown in FIGURE 11 the swing arms, such as 38, have a block 126 fastened to their outer side. A disconnect arm 124 has its end shaped with a step-like portion to cooperate with the block 126 and a disconnect bolt 128 is normally fastening the end of the disconnect arm to the block. When the rocker arms are to be swung out, the bolt 128 is unfastened, the cap 120 is loosened by backing out bolts 122 and the rocker arms are swung out manually until the edges of the rocker arms which register with rollers 138 of a roller bearer 136 are brought into contact with the rollers. Handwheel 130 is then rotated in the appropriate direction threading jackscrew 134 through a support block 132 thereby bringing the roller bearer 136 to a retracted position close to the support block, allowing the rocker arm 32 to occupy a position as indicated in dotted lines. The key 104, keying the rocker arms to the shaft 28, also keys the shaft to the disconnect arm 124, but does not penetrate in the bore extent in the end of swing arm 38 and its cap 120. Therefore when cap 120 is loosened, the shaft 28 is free to rotate, swinging the rocker arms out of the plane of the discs as hereinbefore mentioned.

FIGURES 12 to 15 show the flex-joints supporting the rocker arm shaft 28 and 30 in the rocker arm shaft housing 22 and the end bearings 24 and 26.

The rocker arm shaft has on its end which is situated within the housing 22 an integral lug portion 140 provided with two radial faces 142 and 144 in planes at a 90° angle. A bushing 146, disposed in the housing 22, carries a block 148 similarly provided with radial faces 150 and 152 in planes at a 90° angle. The block 148 is fastened to the bushing 146 by means of a key 153 and of screws such as 154.

Flexible flat reed members 156, 158, 160 and 162 are mounted on the block 148 by means of mounting plates 164 and 166 and screws such as 168. The reed members are mounted in a criss-cross fashion, alternately clamped upon face 150 and face 152 of the block 148, and the other ends of the reed members are fastened to the faces 142 and 144 of the lug portion 140 of the rocker arm shaft by means of mounting plates 170 and 172 fastened thereon by screws such as 174.

The other end of the rocker arm shaft is also provided with a lug portion 176 supported away from a block 178 by means of the criss-cross right angled flexible reed members 180, 182, 184 and 186 mounted by their appropriate ends upon the radial faces of the block 178 by means of the mounting plates 188 and 190 and associated mounting screws 192, and having their other ends fastened to the radial faces of the lug 176 by means of the mounting plates 194 and 196 and associated fastening screws 198. The block 178 is fastened to a bushing 200 by key 201 and screws 202, and the bushing in turn is maintained in a bore in the rocker arm shaft end bearing 26.

The flex-joints just described, supporting the rocker arm shafts at both ends, provide a frictionless and hysteresisless pivot means for the shafts, enabling the rocker arm shafts to be swung freely a few degrees on both sides of a neutral position. The end of the shafts which are supported from the end bearings is left free to expand in relation to its mounting block 178 by providing only one screw for each end of the flexible reed members, thus enabling the flexible reed members to slidably rock their clamped ends out of normal alignment to compensate for differences in the respective lengths of the rocker arm shafts and the rocker arm shaft housing.

Bushing 146 is normally immobilized in the housing 22 by a clamping device consisting of two cylindrical clamping segments 204 and 206 slidably disposed in a bore 208 in housing 22. Clamping segments 204 and 206 have cut-out arcuate portions 210 and 212 adapted to abut against the outer surface of bushing 146. When threaded member 214 is rotated, opposite threads 216 and 218 draw clamping segments 204 and 206 together, thereby clamping and immobilizing the bushing 146 by the wedging action of the arcuate portions 210 and 212 of the clamping segments 204 and 206, respectively.

The bushing 200 in the end bearing 26 is clamped and immobilized in a similar fashion by means of the threaded member 220 driving cylindrical clamping segments 222 and 224.

Before swinging the rocker arms outwardly for inspection and maintenance, the bushings 146 and 200 are freed by turning the threaded members 214 and 220 in the direction which separates the clamping segments 204–206 and 222–224, respectively. The bushings are thus free to rotate, preventing any undue bending stress on the flexible reed members.

When the rocker arms are brought back to their normal position, by elevation by way of the jackscrew 134 under the action of the handwheel 130 (FIGURE 11), the bushings 146 and 200 rotate under the action of the flexible reed members until they occupy a position approximate their normal position. An indexing tool 226, having a conical end 228 and a pilot member 230 integral therewith is introduced through an access bore 232 in order to bring bushings 146 and 200 to their exact position by registering the pilot member 230 with an indexing hole 234 in the bushings. The bushings are then immobilized by tightening the clamping segments by means of their respective threaded members 214 and 220.

A pin 236 affixed to the bushing 146, projects into a recess 238 in the lug portion 140 of the rocker arm shaft. The difference of diameters of the pin and of the recess provide the necessary clearance to enable the rocker arm shaft to rock freely from one extreme position to another extreme position during normal operation, but forces the rocker arm shaft to carry with it the bushing when the rocker arm is swung out for inspection and maintenance.

Bushing 200, at the other end of the rocker arm shaft, is similarly provided with a pin 240 projecting into a recess 242 in the lug portion 176 of the rocker arm shaft, in the same manner and for the same reasons as aforementioned in relation to bushing 146.

*Access mechanism*

The access or address mechanism consists of a digital positioner 46 (FIGURES 2, 4, 5 and 6) provided with an output shaft 44 which is capable of occupying any one of a plurality of discrete positions, as ordered by signals in binary form actuating the control valves 48. The positioner herein illustrated, and which is no part of the present invention, is more fully described in copending application Serial No. 98,549, now Patent No. 3,141,388, of Jack M. Brandstadter. Linear positions such as are disclosed in U.S. Patent No. 3,009,759, issued November 21, 1961, to Johnson et al., copending application Serial No. 97,928, filed on March 23, 1961, by Joseph E. Smith, Jr., and which has now been issued as Patent No. 3,114,296 on December 17, 1963, or rotary actuators and positioners such as are described in U.S. Patent No. 2,911,956, issued November 10, 1959, to Joseph E. Smith, Jr., and in copending U.S. patent application Serial No. 784,302, filed December 31, 1958, by Thor H. Ljunggren, which has now matured as Patent No. 3,050,247, issued August 21, 1962, could be also used instead of the particular linear positioner herein illustrated.

As ordered by the address input signals, the positioner output shaft 44 can be displaced to any one of a possible total one of the 128 discrete positions. It is evident that binary positioners with an output shaft capable of being positioned to 32, 64, 256, or to 512 positions could be used in the place of the particular positioner herein illustrated.

For the purpose of describing the present invention, it will suffice to indicate that the positioner 46 consists of an assembly of seven individual displacement motor stages having individual strokes of 1, 2, 4, 8, 16, 32 and 64 units of displacements, and whose individual strokes are summed up by the output shaft 44. Each motor stage is selectively controlled by one of the valves 48. Valves 48 are solenoid operated electro-hydraulic valves to admit fluid under pressure to the appropriate motor stages and to exhaust fluid therefrom, and they are selectively operated by parallel electrical signals in a binary form energizing the solenoid of the appropriate valve or valves.

A position comparator (not shown) compares the position of the output shaft with the ordered position to prevent false addressing of data.

The end of the positioner output shaft 44 is fashioned to a yoke member 42 which is in turn fastened to the ends of the two swing arms 38 and 40. The swing arms translate the linear motion of the positioner into a rotary motion of the rocker arm shaft 28 and 30, as herein before explained. The rocker arm 32 carrying the transducer head assemblies 36 are thus swingable to any one of 128 possible angular discrete positions. The six couples of heads mounted on a common head bar assembly 34 are thus positioned altogether to one position out of 128 possible positions. The appropriate head is then selected electronically for the purpose of recording on or playback from the appropriate track on the disc surface.

*Clock heads*

Sprocket or timing pulse bits are recorded on a track close to the edge of some of the discs for the purpose of synchronizing the recording and playback of information bits.

Figure 1:
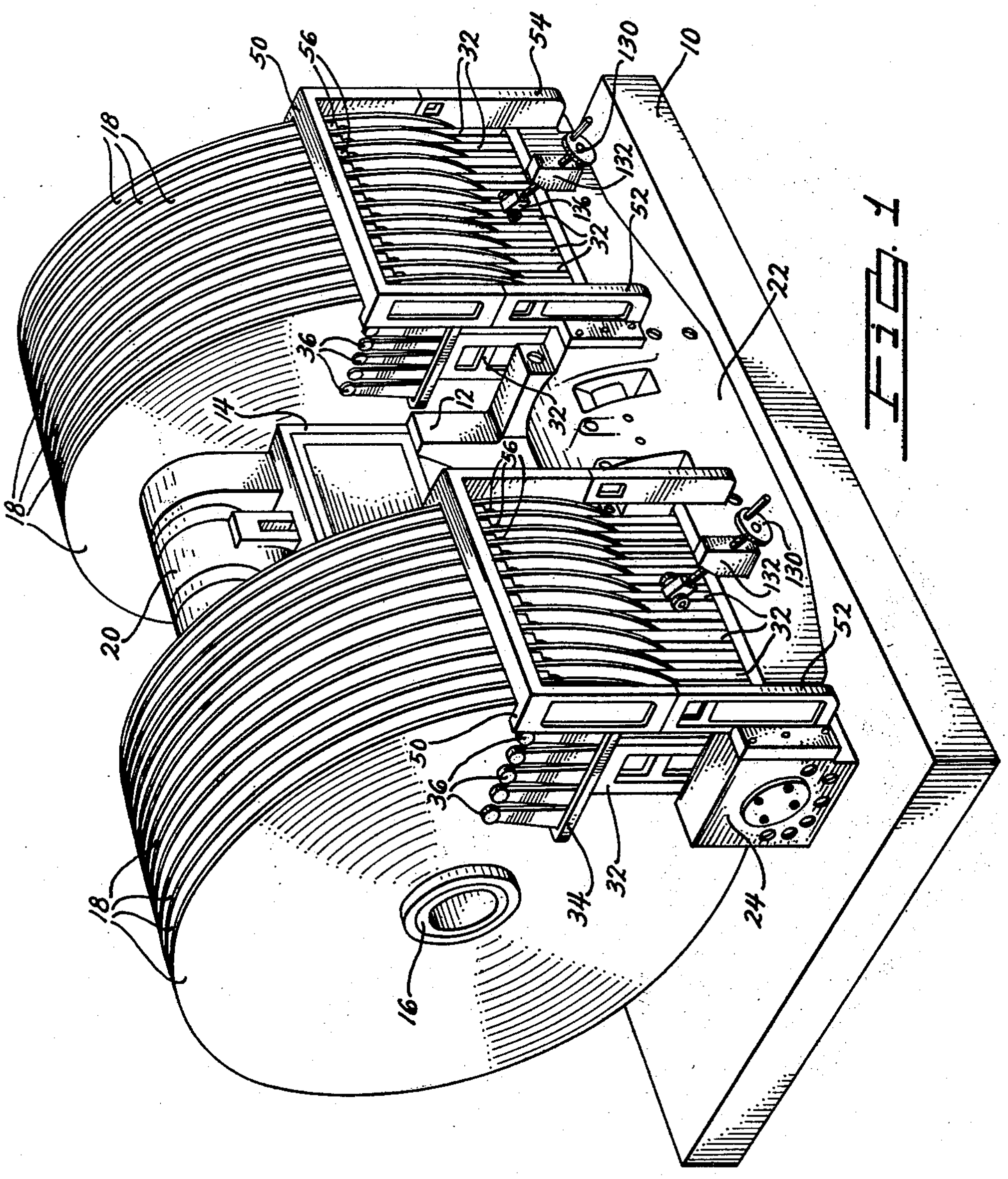
FIGURE 1 is a perspective view of an apparatus constructed in accordance with the invention.

The clock heads, designed generally by reference numeral 56, are mounted below a truss or bridge member 50, extending parallel to the disc spindle along the edge of the discs, and supported from the rocker arm shaft housing 22 by means of the clock heads bridge support members 52 and 54 (FIGURE 1).

Figure 16:
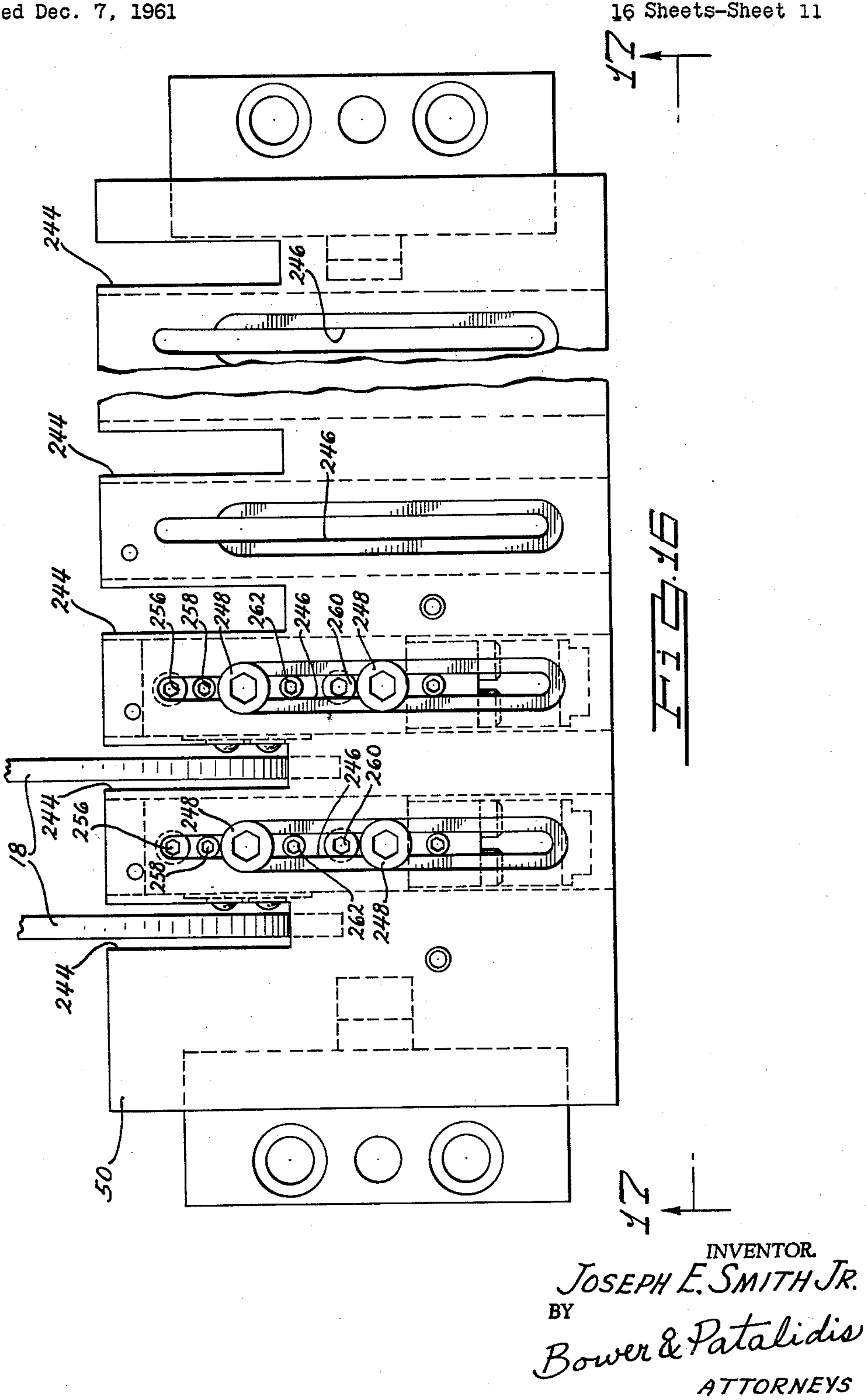
FIGURE 16 is a top plan view of another component of the apparatus.
Figure 17:
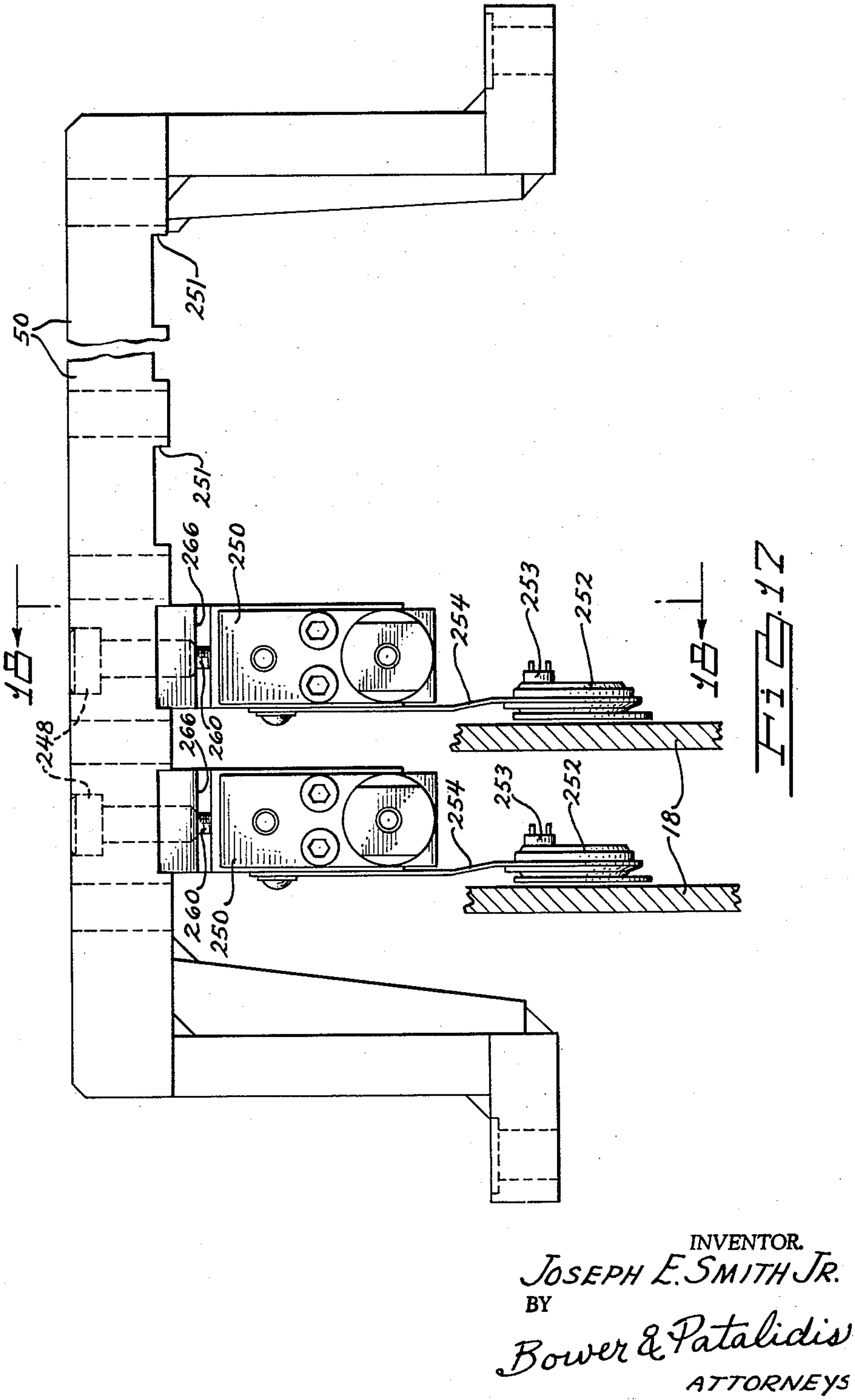
FIGURE 17 is a side elevation view of the component of FIGURE 16 as seen from line 17—17 of FIGURE 16.

Referring now to FIGURES 16–18 the clock bridge 50 is provided with notches 244 in order to clear the discs 18. The clock bridge 50 has a series of slots 246 affording a passage for mounting screws 248 clamping transducer head mounting blocks 250 to the channels 251 on the undersurface of the clock bridge.

Transducer head pads 252 mounted on the end of a resilient reed 254 and carrying transducer head 253, are supported away from their appropriate mounting blocks 250. A device, not shown, operates a plunger bending the reed 254 in order to bring the transducer head into a flying position as soon as the rotation of the discs is sufficient to create a bearing laminar film of air. The mounting blocks 250 are provided with adjusting screws 256, 258, 260 and 262, cooperating with slots 264 and 266 for longitudinal and radial adjustment of the alignment of the transducer head pole pieces in relation to the appropriate clock track.

The clock heads are situated on a radius of the discs which is substantially the same as the radius on which the data heads are situated when they occupy the midposition of their arcuate scanning of the surface of the discs. As a result, no synchronization error of any practical significance is introduced into the recording and playback of the data due to expansion or contraction of the discs, as could be the case if the clock heads and data heads were in substantial angular spacial relationship.

The clock heads are herein shown mounted below the clock bridge for illustrative purpose only. It is evident that such an arrangement is only a matter of choice, and that the clock heads can as well be mounted above the clock bridge and it is contemplated to mount the clock heads either above or below the clock bridge and it is also contemplated to use only one clock bridge where so convenient.

The clock heads herein shown also for illustrative purpose only are of the "flying" or "non-contact" type. It is evident that "contact" transducer heads, or heads in contact with the record surface during the starting and stopping periods of the operation of the apparatus, could be used without departing from the spirit and scope of the present invention.

*Tracks*

FIGURES 19–21 show various ways of using the magnetizable surfaces of the discs for recording of data upon concentric tracks.

In a preferred embodiment of the disc file of the invention, 768 concentric tracks are disposed, equally spaced, on each face of the discs. With a total of 6 transducer heads per face, each transducer head is adapted to record on or read from any one of 128 tracks. Each one of the 768 tracks on a given disc face has a different length and if information, using the maximum bit density practical in function of the characteristics of the magnetizable surface and of the transducer heads, was sought to be recorded on each track, each track would be recorded at a different frequency, the 768 such frequencies increasing from the innermost track to the outermost track. Such a method would require 768 timing tracks, leading to great cost and complications.

On the other extreme, one frequency may be arbitrarily selected, that frequency being determined by the amount of bit density compatible with recording on the innermost track. The frequency being the same for all the tracks of all the discs, one timing track per apparatus is sufficient. Such a method of recording data is represented in FIGURE 19, where all the tracks, operating at the same frequency, and having consequently the same capacity in number of bits, are all situated in one zone, identified as zone 1. One timing track 268 is required, shown close to the edge of one face of one disc of the whole apparatus.

To obtain improved capacity of the disc file the surface of each disc may be divided in two zones, identified as zone 1 and zone 2 in FIGURE 20. The tracks in zone 1, one half of the total number of tracks, operate at a given frequency compatible with a practical bit density on the innermost track, and the tracks in zone 2 operate at another frequency compatible with a practical bit density in the innermost track of zone 2. It is often convenient to operate in zone 2 with a frequency double the frequency of zone 1; twise the amount of data recordable on any track of zone 1 can thus be recorded on the tracks of zone 2 and the timing sprocket bits of zone 2 may be supplied from the same frequency source as the timing sprocket bits of zone 1, through a frequency doubler. Two timing tracks are required per disc file, each such timing track 268 being shown placed close the edge of any two disc faces.

A six zone arrangement as shown in FIGURE 21, results in the most efficient use of the recording surface of each disc face, where six heads are mounted to operate on each disc face. Six different frequencies of recording are used, increasing from zone 1 to zone 6, in order to provide maximum bit packing.

Using for example a positioner giving at the output shaft 128 discrete positions, and six heads per disc face, each head will operate over its own zone, being there positionable to any one of 128 tracks.

Where six zones are used, six sprocket or timing tracks are of course required. This necessitates mounting six clock heads on the clock bridge, each one reading from the clock track near the edge of six different disc faces and providing six different timing frequencies, one frequency for each zone.

*Special purpose tracks*

FIGURE 22 shows an example of use of the outer face of the last disc for effecting operations which are usually of the resort of the computer such as register, recirculation loops, delay lines, precession, etc., which require provisory accumulation of data.

A support bracket 270 is fastened to the end bearing housing 26 of the rocker arm shaft housing. The support bracket carries a plurality of reed supported heads 272 and 274 in normally fixed, although preadjustable, positions. Those heads may be situated on a diameter of the disc 18 and one set of heads 272 may be used for recording data which is read by the other set of heads 274. Data which is recorded by means of the heads 272 and which is immediately read by the heads 274 has been delayed for a period of time corresponding to one half of the time that it takes the disc to effect a complete revolution.

Other heads such as 276 and 278 mounted on blocks such as 280 and 282 adjustable along the edges of a semicircular slot 284 in the support bracket 270 may be used for different delays as may be required.

The example of FIGURE 22 is for illustrative purpose only and the possibilities of such arrangements are numerous as will be evident to those skilled in the art. It is also evident that, due to the fact that the number of clock tracks and of corresponding clock heads is only equal to the number of track zones as explained previously, a certain number of tracks corresponding to the unused clock tracks close to the edge of each disc face is also available for special purpose operations. For example, assuming a disc file comprising 24 discs used for normal data recording on six frequency zones, six clock tracks and clock heads only are used to provide the necessary timing or sprocket pulses. Assuming that only one face of each disc only has a clock track thereupon, 18 faces have a free peripheral track available for whatever purpose the system designer may require. Transducer heads mounted upon the clock head bridges 50, as hereinbefore explained, can be used to record on and read from the said peripheral tracks and, alternately, if so desired, the clock head bridges may be omitted and some of the tracks on the outer face of the last disc may be used as clock tracks, the timing pulses thereon being read by transducer heads such as transducer heads 272 and 274.

*Building-block principle of the disc file*

FIGURE 23 illustrates a portion of the frame of the disc file of the invention with a disc spindle 16 extending on both sides of the spindle bearing housing 14. FIGURE 24 illustrates a similar arrangement, but with a shorter disc spindle 16 and a corresponding shorter rocker arm shaft housing 22 and rocker arm shafts, providing a disc file having a lesser capacity. The pedestal 12, the spindle bearing housing 14, and the driving means for the spindle 16 are the same standardized parts, as are the discs, the transducer heads, the rocker arms, the positioner, etc.

FIGURE 25 illustrates another possible example of components arrangement, in which the spindle 16 extends only on one side of the spindle bearing housing 14, giving a further reduced capacity file, using still the same standard parts. By using such a building block principle, a disc file of any given capacity, from for example 26 discs to only one disc, could be manufactured according to customer's requirement.

FIGURES 26 and 27 show diagrammatically how up to four positioners 286, 288, 290 and 292 may be used to individually control four rocker arm shafts and four sets of rocker arms. Positoner 286 is used to control rocker arm shaft 294, positioner 288 is used to control rocker arm shaft 296, positioners 290 and 292 are used to control rocker arm shafts 298 and 300, respectively. In this fashion, rocker arms 302, 304, 306 and 308 are swingable independently, thereby providing faster addressing of the tracks and independent recording or reading of the information and the possibility of effecting plural recording or playback of data.

The data transducer heads carried by rocker arms 302 and 304 may be used to record and read pulses on one half of the length of the tracks, and the transducer heads carried by rocker arms 306 and 308 may be used to record and read pulses on the other half of the length of the same tracks, which results, among other advantages, in a considerably reduced addressing time. Or, the data transducer heads carried by rocker arms 302 and 304 may be used to record and read pulses on every other track, and the transducer heads carried by rocker arms 306 and 308 may be used to record and read pulses on every alternate other track.

Up to four clock head bridges, 310 to 316, may also be used to increase the number of available timing or special purpose tracks.

The above examples of combinations of elements are given only as so many illustrations of the built-in versatility and flexibility of the invention and many other combinations will be readily apparent to those skilled in the art.

*Operation*

For the sake of explaining the operation of the disc file of the invention, it will be assumed that the apparatus has 24 discs, or 48 record faces, 6 recording zones on each disc face, each operating at a different predetermined frequency requiring therefore 6 timing frequencies, one for each zone, the corresponding zones of each face operating at the same frequency. Six transducer heads cooperate with each disc face, one transducer head per zone. The positioner output can occupy any one of 128 positions, resulting in 128 tracks per zone, or a total of 768 tracks per disc face.

Electric motor 20 is connected to a source of electrical power and the discs 18 are brought to operational spinning velocity, creating a laminar film of air clinging to their surface. As soon as that laminar film of air is sufficient to bear the transducer head pads, the transducer reed supports are biased to bring the pads to the "flying" position where they ride upon a cushion of air. The apparatus is now ready to record information or to read prerecorded information.

A seven bits positioner address signal is fed to the control valves of the positioner. Assuming, for the sake of explanation, that address binary signal 1011001, for example, is fed to the control valves, the output shaft of the positioner is displaced to position 89. All the transducer head bar assemblies are swung to position 89 and all the transducer heads are indexed with track 89 of their respective zone.

Final selection of one or more of the thus indexed heads is then effected electronically, at the same time as the appropriate timing clock head is selected, also electronically.

One head may be selected for serial recording or playback, or several heads may be selected for simultaneous or parallel recording or playback of the information.

*Conclusion*

From the above description it is seen that apparatus constructed in accordance with the teachings of the present invention provide a high capaicty data storage device which is lower in cost, smaller in physical size, simpler to operate and more versatile than apparatus hithero available.

While there have been described and illustrated certain embodiments of the invention, it is to be understood that it is not intended to be restricted solely thereto but that it is, on the contrary, intended to cover all modifications thereof which would be apparent to one skilled in the art and which come within the spirit and scope of the invention.

What is claimed as new is:

1. A magnetic data storage apparatus comprising in combination:

a ground supported deformable base frame;

a rigid pedestal member affixed to said base frame and supporting all the components of said apparatus;

a spindle bearing housing on the top of said pedestal;

an electric motor affixed to the top of said spindle bearing housing;

a spindle journaled in said spindle bearing housing and extending outwardly on both sides thereof;

means for driving said spindle from said electric motor;

a plurality of evenly spaced discs coaxially mounted upon said spindle and having concentric data tracks on a magnetizable surface on both faces thereof;

means individually locking said discs upon said spindle and means collectively fastening said discs together for simultaneous rotation by said spindle;

a box-like open top rocker arm shaft housing fastened to one side of said pedestal proximate the bottom thereof and extending outwardly substantially parallelly said spindle;

two rocker arm shafts rotatable through a predetermined arc, said rocker arm shafts being disposed end to end in said rocker arm shaft housing;

a plurality of substantially equally spaced rocker arms keyed to said rocker arm shafts, each of said rocker arms normally extending between two consecutive discs and the last ones of said rocker arm extending parallelly the faces of the outermost and innermost discs;

evenly spaced data transducer heads supported on the end of each of said rocker arms in equal numbers for recording and playback of data pulses on said disc magnetizable surfaces on concentric tracks thereon;

each one of said transducer heads being supported by a fluid bearing pad fastened to one end of a flat reed spring member, the other end of said spring member being attached to said rocker arm end which is provided with actuating means adapted to bend said spring member in a direction that causes said pad to be displaced toward the disc magnetizable surface as soon as said disc reaches a velocity sufficient to develop a fluid bearing capable of supporting said pad a minute distance away from said surface;

two swing arms each of which is connected to the innermost end of each of said rocker arm shafts through an aperture in said pedestal;

a yoke member rigidly coupling said swing arms together;

a digital signal actuated positioner having an output member capable of occupying any one of a series of equally spaced discrete positions in response to control electrical signals in a binary form;

means connecting said output member to said yoke member whereby linear displacement of said output member are transferred into angular displacements of said rocker arms thereby causing said data transducer head to be indexed for recording and playback in relation to said concentric data tracks;

a timing track close to the edge of some of the disc faces with timing pulses recorded thereon for synchronization of recording and playback of said data pulses;

and a clock transducer head per said timing track for reading of said timing pulses recorded thereon.

2. A magnetic data storage apparatus according to claim 1 wherein:

the concentric data tracks on the magnetizable surface on the discs are equally divided between several concentric frequency zones and all the tracks in a given zone have data pulses recorded thereon at a constant frequency;

the rocker arms carry each at least one data transducer head for each one of said zones;

and as many timing tracks and corresponding clock transducer heads are provided as there are zones, each such timing track being provided close to the edge of a face of some of the discs.

3. A magnetic data storage apparatus according to claim 1 wherein:

the available tracks close to the edge of a face of the discs free from timing tracks are used for provisory accumulation of data;

and the outer face of at least one outermost disc is used for provisory accumulation of data.

4. A magnetic data storage apparatus according to claim 1 wherein:

the rocker arm shafts are supported by flex joint pivot members comprising radially flexible reed members alternately disposed at right angle to one another and having one of their ends fastened to a block affixed to a bushing clamped in a bore in said rocker arm shaft housing and their other ends fastened to a sector lug portion of said shaft.

5. A magnetic data storage apparatus according to claim 4 having:

means for quick disconnect of said swing arms from said rocker arm shafts;

means for unclamping said bushings in said rocker arm shaft housing;

manual means for angularly rotating said rocker arms and rocker arms shafts with said bushings rotating in their corresponding bores in said rocker arm shaft housing whereby said data transducer heads are swung clear of said discs;

and means for returning said rocker arm shafts and bushings and rocker arms to the position they previously occupied for reconnecting said swing arms to said rocker arm shafts.

6. A magnetic data storage apparatus comprising in combination:

a supporting base;

a pedestal fastened to said supporting base;

a substantially horizontal spindle rotatably mounted through a housing situated in the upper portion of said pedestal;

said spindle extending outwardly outboard of said pedestal on at least one side thereof;

a drive motor fastened to the top of said housing;

means transmitting the rotation of the shaft of said drive motor to said spindle;

a plurality of identical even spaced substantially flat discs rigidly fastened to said spindle for rotation therewith;

each one of said discs having at its center portion a hub member for fastening upon said spindle;

means fastening said hub member to said spindle and means fastening together a plurality of hub members;

a magnetizable recording surface layer on both sides of each of said discs between said hub member and the edge of the disc;

at least one magnetic transducer head supported in close juxtaposition with said magnetizable surface for recording and reading information in the form of magnetic pulses recorded on concentric tracks on said magnetizable surface;

a holder for said transducer head movable parallelly said magnetizable surface;

means for causing said holder to occupy predetermined radial positions in response to a track address command signal;

and means for providing timing pulses for the purpose of timing and synchronizing said recording and reading of information on said concentric tracks;

wherein:

the magnetizable surface on the discs comprises several concentric recording zones having each a proper recording frequency, each one of said zones being subdivided in several concentric recording tracks;

said holder carries at least one transducer head for each of said recording zones;

the means for providing timing pulses for the purpose of timing and synchronizing the recording and reading of information on said concentric tracks consists of clock tracks at least equal in number to the number of said recording zones;

and a corresponding number of transducer heads are mounted on a fixed position for reading timing pulses recorded on said clock tracks.

7. A magnetic data storage apparatus according to claim 6 wherein the selection of the proper track in the proper zone is determined by the radial position of said holder;

and the selection of the proper zone is effected by means switching on the appropriate transducer head and switching off the other transducer heads, while switching on the appropriate transducer head reading timing pulses from the appropriate frequency clock track.

8. A magnetic data storage apparatus comprising in combination:

a supporting base;

a pedestal fastened to said supporting base;

a substantially horizontal spindle rotatably journaled through a housing mounted on the top of said pedestal, said spindle extending outwardly outboard of said pedestal on at least one side thereof;

means rotatably driving said spindle;

at least one disc mounted on said spindle for rotation thereby;

a magnetizable surface layer on both sides of said disc;

at least one magnetic transducer head supported on a fluid bearing pad in close juxtaposition with said magnetizable surface for recording and reading data pulses on concentric data tracks on said magnetizable surface, several contiguous such data tracks being grouped in a frequency zone and several such frequency zones being concentrically disposed on each side of said disc;

means for causing said transducer head to be arcuately movable parallelly said magnetizable surface for scanning any one of said data tracks in response to a selection signal, at least one magnetic transducer head being provided for scanning each one of said zones;

a clock track on said magnetizable surface for each one of said zones, said clock track having timing pulses recorded thereon at the frequency of the zone corresponding thereto;

and a magnetic transducer head for each clock track mounted on a fixed position for reading timing pulses from said clock track, so as to synchronize the recording and reading of data pulses at the frequency assigned to the zone comprising the data track on which such data pulses are recorded and from which such data pulses are read.

9. Magnetic data storage apparatus comprising:

a support base frame;

a rigid pedestal affixed to said base frame and supporting all the components of said apparatus;

a spindle bearing housing on the top of said pedestal;

an electric motor affixed to the top of said spindle bearing housing;

a spindle journalled in said spindle bearing housing and extending outwardly on at least one side thereof;

means for driving said spindle from said electric motor;

a plurality of evenly spaced discs coaxially mounted upon said spindle and having concentric data tracks on a magnetizable surface on both faces thereof;

means individually locking said discs upon said spindle and means collectively fastening said discs together for simultaneous rotation by said spindle;

a rocker arm shaft support bearing housing fastened to one side of said pedestal proximate the bottom thereof;

at least one rocker arm shaft rotatable through a predetermined arc, said rocker arm shaft being disposed parallel to said spindle and being journaled in said rocker arm shaft support bearing;

a plurality of substantially equally spaced rocker arms fastened to said rocker arm shaft, each of said rocker arms normally extending between two consecutive discs and the last ones of said rocker arm extending parallelly the faces of the outermost and innermost discs;

evenly spaced data transducer heads mounted on fluid bearing pads resiliently supported from the end of each of said rocker arms in equal numbers for recording and playback of data pulses on said disc magnetizable surfaces on concentric tracks thereon;

actuator means adapted to displace said data transducer head pads from a position away from said disc magnetizable surfaces to a position of close proximity thereto as soon as said discs are rotating at a speed sufficient to develop a fluid bearing strong enough to support said fluid bearing pads;

a digital signal actuated positioner fastened to said pedestal and having an output member capable of occupying any one of a series of equally spaced discrete positions in response to control electrical signals in a binary form;

means connecting said output member to said rocker arm shaft whereby linear displacements of said output member are transferred into angular displacements of said rocker arms thereby causing said data transducer heads to be indexed for recording and playback in relation to said concentric data tracks;

timing tracks on some of the disc magnetizable surfaces with timing pulses recorded thereon for synchronization of recording and playback of said data pulses;

a clock transducer head confronting each one of said timing tracks for reading of said timing pulses recorded thereon, at least one of said clock transducer heads being mounted on a fluid bearing pad resiliently mounted on a fixed support;

and actuator means adapted to displace said clock transducer head pad from a position away from said disc magnetizable surface to a position of close proximity thereto as soon as said discs are rotating at a speed sufficient to develop a fluid bearing strong enough to support said fluid bearing pad.

10. The apparatus of claim 9 wherein:

the concentric tracks where the data pulses are recorded on each disc face are divided in $n$ frequency zones;

the zone frequencies increase from the zone proximate to the center of each disc face to the zone proximate to the periphery;

each zone contains an equal number of tracks, all recorded and read at the same zone frequency;

$n$ sets of timing pulses are recorded on $n$ timing tracks;

and each zone is serviced at least by one data transducer head.

11. Apparatus according to claim 9 wherein:

up to two angularly movable rocker arm shafts are symmetrically disposed on both sides of said pedestal, each one of said shafts carrying a plurality of data transducer head supporting rocker arms;

and said rocker arm shafts are individually positionable to discrete angular positions by separate positioner means controlled by separate selection signals.

12. Apparatus according to claim 9 wherein:

at least one disc face is serviced by transducer heads mounted in fixed positions;

and some of the tracks serviced by said transducer head are used for provisory accumulation of data.

References Cited by the Examiner

UNITED STATES PATENTS

| | | | |
|---|---|---|---|
| 2,800,642 | 7/57 | May | 340—174.1 |
| 2,811,709 | 10/57 | Haselton et al. | 340—174.1 |
| 2,907,009 | 9/59 | Lesser | 340—174.1 |
| 3,007,144 | 10/61 | Hagopian | 340—174.1 |

IRVING L. SRAGOW, *Primary Examiner.*